United States Patent
Motomura et al.

(10) Patent No.: US 10,414,044 B2
(45) Date of Patent: Sep. 17, 2019

(54) ROBOT ARM AND ROBOT SYSTEM

(71) Applicant: KABUSHIKI KAISHA YASKAWA DENKI, Kitakyushu-shi (JP)

(72) Inventors: Youichi Motomura, Kitakyushu (JP); Kentaro Tanaka, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 170 days.

(21) Appl. No.: 15/604,655

(22) Filed: May 25, 2017

(65) Prior Publication Data
US 2017/0252920 A1    Sep. 7, 2017

Related U.S. Application Data

(63) Continuation of application No. PCT/JP2014/081297, filed on Nov. 26, 2014.

(51) Int. Cl.
*B25J 9/10* (2006.01)
*B25J 9/00* (2006.01)
*B25J 17/02* (2006.01)
*B25J 19/00* (2006.01)

(52) U.S. Cl.
CPC ............. *B25J 9/102* (2013.01); *B25J 9/0009* (2013.01); *B25J 17/0258* (2013.01); *B25J 19/0025* (2013.01); *Y10S 901/23* (2013.01); *Y10S 901/26* (2013.01)

(58) Field of Classification Search
CPC ....... B25J 9/102; B25J 9/0009; B25J 17/0258
See application file for complete search history.

(56) References Cited

U.S. PATENT DOCUMENTS

| | | | | |
|---|---|---|---|---|
| 8,549,949 | B2 * | 10/2013 | Long | B25J 9/103 74/440 |
| 2004/0261562 | A1 | 12/2004 | Haniya et al. | |
| 2011/0290060 | A1 * | 12/2011 | Long | B25J 9/103 74/490.01 |
| 2013/0055842 | A1 * | 3/2013 | Okada | B25J 9/102 74/490.03 |
| 2013/0074651 | A1 * | 3/2013 | Furuichi | B25J 9/042 74/665 L |

(Continued)

FOREIGN PATENT DOCUMENTS

| | | |
|---|---|---|
| JP | 61-182788 | 8/1986 |
| JP | 61-197842 | 9/1986 |

(Continued)

OTHER PUBLICATIONS

International Search Report for corresponding International Application No. PCT/JP2014/081297, dated Jun. 2, 2016.

(Continued)

*Primary Examiner* — Terence Boes
(74) *Attorney, Agent, or Firm* — Mori & Ward, LLP

(57) ABSTRACT

A robot arm includes a first holder and a second holder. The first holder includes a first base portion and a first distal portion. The first distal portion has a first distal thickness smaller than a thickness of the first base portion. The second holder includes a second base and a second distal portion. The second distal portion has a second distal thickness smaller than a thickness of the second base portion. A first rotator is supported by the first distal portion and the second distal portion. A second rotator is supported by the first rotator. A first bevel gear is provided in the first distal portion. Another first bevel gear is provided in the second distal portion. A second bevel gear engages with the first bevel gear and the another first bevel gear.

24 Claims, 15 Drawing Sheets

(56) References Cited

U.S. PATENT DOCUMENTS

| | | | |
|---|---|---|---|
| 2013/0125695 A1* | 5/2013 | Long | B25J 9/103 74/490.05 |
| 2013/0333509 A1 | 12/2013 | Adachi | |
| 2014/0148293 A1* | 5/2014 | Akae | B25J 9/0087 475/6 |
| 2014/0224058 A1 | 8/2014 | Tanaka et al. | |
| 2014/0290418 A1* | 10/2014 | Long | B25J 9/103 74/490.05 |
| 2014/0318298 A1* | 10/2014 | Inoue | B25J 17/02 74/490.03 |
| 2018/0021960 A1* | 1/2018 | Grant | A61B 34/30 |

FOREIGN PATENT DOCUMENTS

| | | |
|---|---|---|
| JP | 62-282887 | 12/1987 |
| JP | 01-012790 U | 1/1989 |
| JP | 01-150042 | 6/1989 |
| JP | 03-202287 | 9/1991 |
| JP | 05-131388 | 5/1993 |
| JP | 2003-200376 | 7/2003 |
| JP | 2013-052460 | 3/2013 |
| JP | 2014-000612 | 1/2014 |
| JP | 2014-151413 | 8/2014 |
| WO | WO 2010/127701 | 11/2010 |

OTHER PUBLICATIONS

Japanese Office Action for corresponding JP Application No. 2016-561151, dated Apr. 17, 2018 (w/ English machine translation).

International Preliminary Report on Patentability with Translation of Written Opinion of the International Searching Authority for corresponding International Application No. PCT/JP2014/081297, dated Jun. 8, 2017.

* cited by examiner

ROBOT ARM AND ROBOT SYSTEM

CROSS-REFERENCE TO RELATED APPLICATIONS

The present application is a continuation application of International Application No. PCT/JP2014/081297, filed Nov. 26, 2014. The contents of this applications are incorporated herein by reference in their entirety.

BACKGROUND

Field of the Invention

The embodiments disclosed herein relate to a robot arm and a robot system.

Discussion of the Background

Japanese Unexamined Patent Application Publication No. 2014-151413A1 discloses a robot that includes a hollow robot arm.

SUMMARY

According to one aspect of the present disclosure, a robot arm includes a first holder, a second holder, a first rotator, a second rotator, at least one motor, a first bevel gear, an another first bevel gear, and a second bevel gear. The first holder has a first distal end and a first base end to be connected to a robot body and opposite to the first distal end in a second axis direction along a second axis. The first holder includes a first base portion and a first distal portion. The first base portion has the first base end and a first base thickness in a first axis direction along a first axis substantially perpendicular to the second axis. The first distal portion has the first distal end and is connected to the first base portion. The first distal portion has a first distal thickness smaller than the first base thickness in the first axis direction. The second holder has a second distal end and a second base end to be connected to the robot body and opposite to the second distal end in the second axis direction. The second holder includes a second base and a second distal portion. The second base portion has the second base end and a second base thickness in the first axis direction. The second distal portion has the second distal end and is connected to the second base portion. The second distal portion has a second distal thickness smaller than the second base thickness in the first axis direction. The first rotator is supported by and between the first distal portion and the second distal portion to be rotatable around the first axis. The second rotator is supported by the first rotator to be rotatable around the second axis. The first bevel gear is provided in the first distal portion to be driven by the at least one motor to rotate the first rotator around the first axis. The another first bevel gear is provided in the second distal portion to be driven by the at least one motor to rotate the second rotator around the second axis. The second bevel gear engages with the first bevel gear and the another first bevel gear to rotate the second rotator around the second axis.

According to another aspect of the present disclosure, a robot system includes a robot arm and a controller. The robot arm includes a first holder, a second holder, a first rotator, a second rotator, at least one motor, a first bevel gear, an another first bevel gear, and a second bevel gear. The first holder has a first distal end and a first base end to be connected to a robot body and opposite to the first distal end in a second axis direction along a second axis. The first holder includes a first base portion and a first distal portion. The first base portion has the first base end and a first base thickness in a first axis direction along a first axis substantially perpendicular to the second axis. The first distal portion has the first distal end and is connected to the first base portion. The first distal portion has a first distal thickness smaller than the first base thickness in the first axis direction. The second holder has a second distal end and a second base end to be connected to the robot body and opposite to the second distal end in the second axis direction. The second holder includes a second base and a second distal portion. The second base portion has the second base end and a second base thickness in the first axis direction. The second distal portion has the second distal end and is connected to the second base portion. The second distal portion has a second distal thickness smaller than the second base thickness in the first axis direction. The first rotator is supported by and between the first distal portion and the second distal portion to be rotatable around the first axis. The second rotator is supported by the first rotator to be rotatable around the second axis. The first bevel gear is provided in the first distal portion to be driven by the at least one motor to rotate the first rotator around the first axis. The another first bevel gear is provided in the second distal portion to be driven by the at least one motor to rotate the second rotator around the second axis. The second bevel gear engages with the first bevel gear and the another first bevel gear to rotate the second rotator around the second axis. The controller is configured to control the robot arm.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
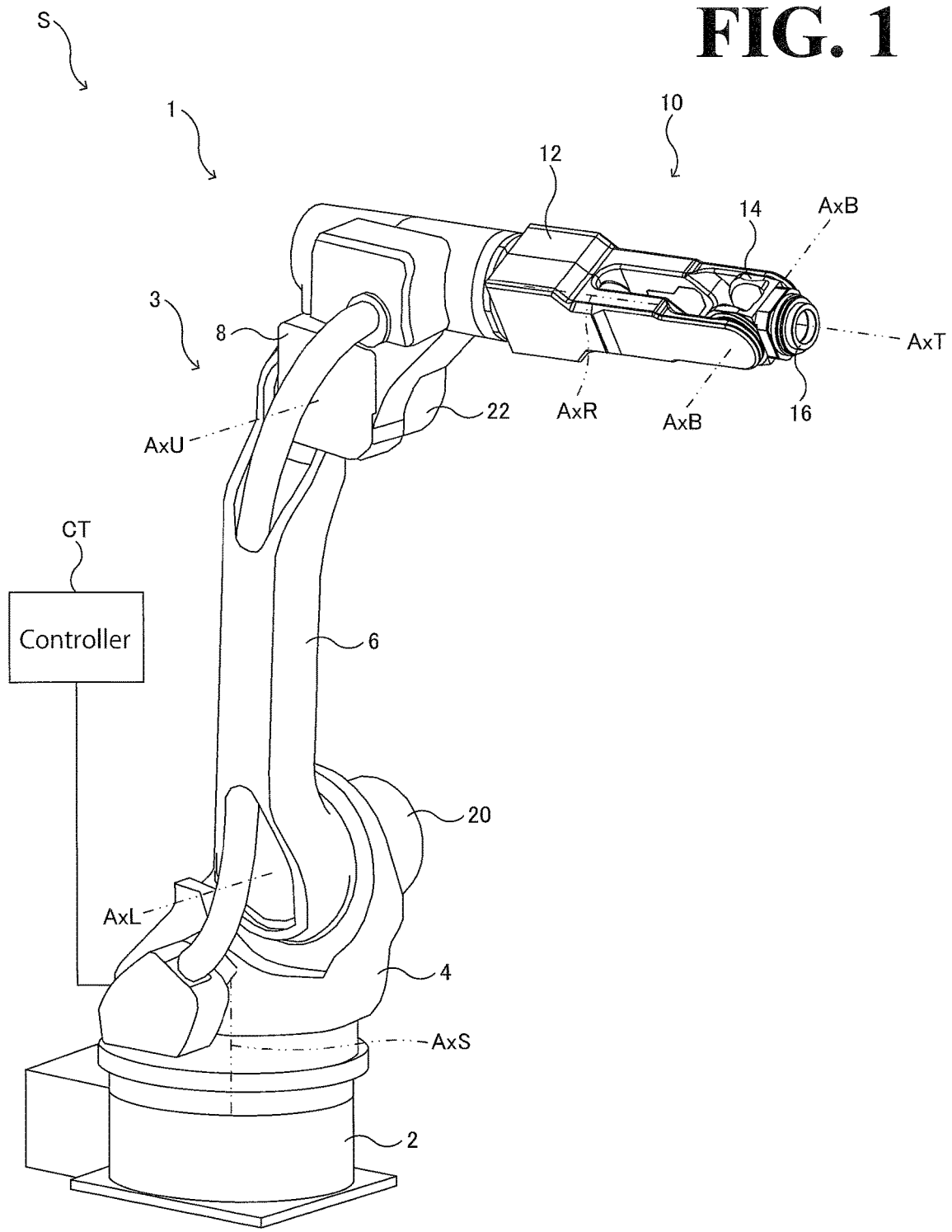
FIG. 1 is a perspective view of a robot system according to a first embodiment illustrating an exemplary configuration of the robot system.
Figure 2:
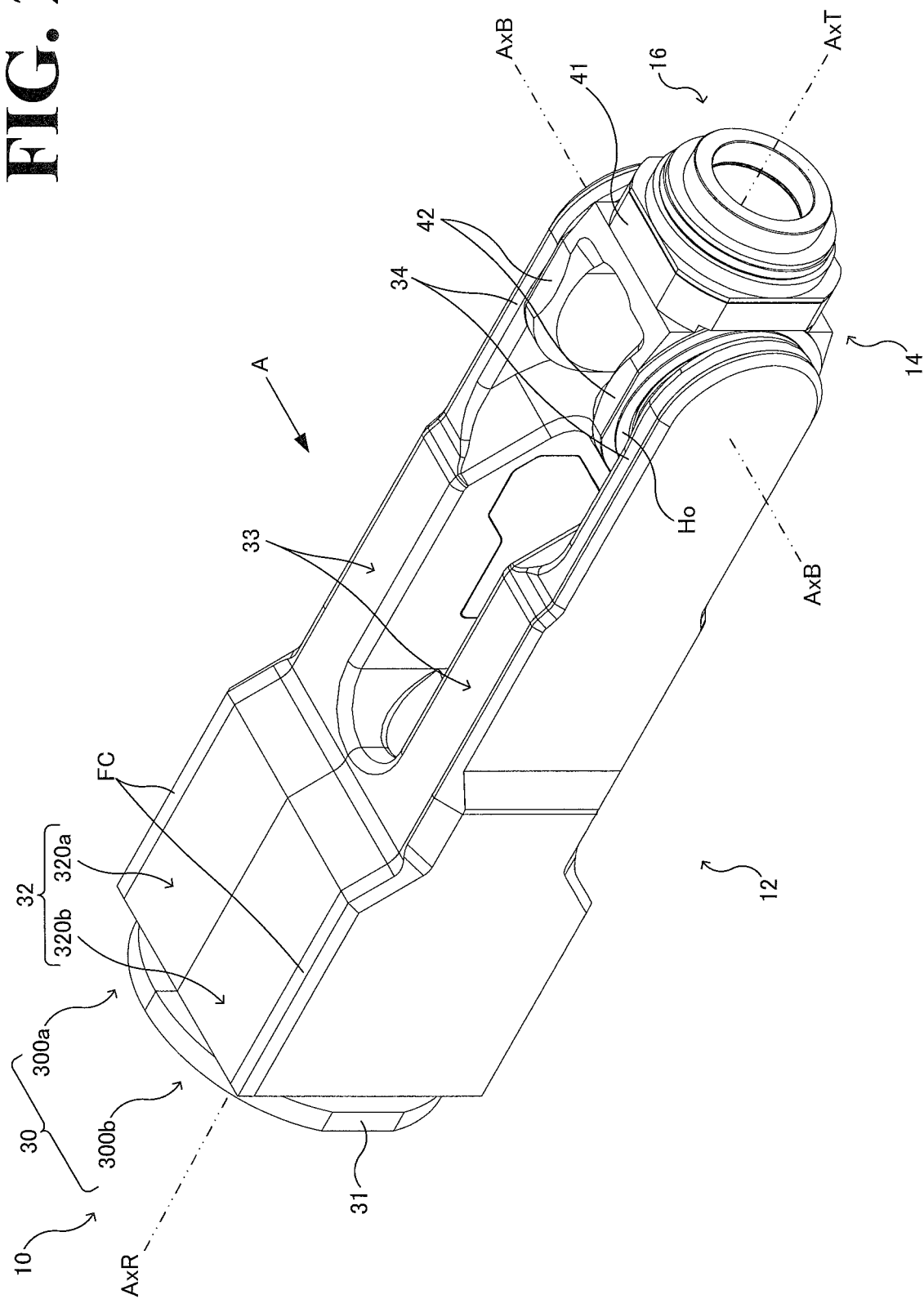
FIG. 2 is a perspective view of a wrist according to the first embodiment illustrating an exemplary configuration of the wrist.

The embodiments will now be described with reference to the accompanying drawings, wherein like reference numerals designate corresponding or identical elements throughout the various drawings.

1. First Embodiment

A first embodiment will be described.

1-1. Exemplary Configuration of Robot System

By referring to FIG. 1, a schematic configuration of the robot system according to this embodiment will be described.

As illustrated in FIG. 1, a robot system S includes a robot 1 and a controller CT.

The robot 1 is a six-axis vertical multi-articular robot having a single arm, and includes a base 2 and an arm 3. The arm 3 includes six movable portions.

The base 2 is secured to the installation surface such as a floor with anchor bolts, for example.

The arm 3 is connected to the base 2. In this specification, the base 2 side end of each movable portion of the arm 3 is defined as the "base end" of the movable portion, and the end opposite to the base 2 side end is defined as the "leading end" of the movable portion. The arm 3 includes a turnable portion 4, a lower arm 6, an upper arm 8, and a wrist 10 (which is a non-limiting example of the "robot arm"). The wrist 10 includes three movable portions.

The turnable portion 4 is supported by the base 2 while being turnable about S axis AxS. The S axis AxS is a turning axis approximately orthogonal to the installation surface. Specifically, the turnable portion 4 is driven by a motor (not illustrated) disposed in the base 2 into turning about the S axis AxS relative to the base 2.

The lower arm 6 is supported by the leading end of the turnable portion 4 while being turnable about L axis AxL. The L axis AxL is a turning axis approximately orthogonal to the S axis AxS. Specifically, the lower arm 6 is driven by a motor (not illustrated) of a motor section 20 into turning about the L axis AxL relative to the leading end of the turnable portion 4. The motor section 20 is disposed at or around the joint between the lower arm 6 and the turnable portion 4.

The upper arm 8 is supported by the leading end of the lower arm 6 while being turnable about a U axis AxU. The U axis AxU is a turning axis approximately parallel to the L axis AxL. Specifically, the upper arm 8 is driven by a motor (not illustrated) of a motor section 22 into turning about the U axis AxU relative to the leading end of the lower arm 6. The motor section 22 is disposed at or around the joint between the upper arm 8 and the lower arm 6.

The wrist 10 is connected to the leading end of the upper arm 8. The wrist 10 includes a first wrist movable portion 12, a second wrist movable portion 14 (which is a non-limiting example of the "first axis movable portion"), and a third wrist movable portion 16 (which is a non-limiting example of the "second axis movable portion").

The first wrist movable portion 12 is supported by the leading end of the upper arm 8 while being turnable about an R axis AxR, which is a turning axis approximately orthogonal to the U axis AxU. Specifically, the first wrist movable portion 12 is driven by a motor (not illustrated) disposed at or around the joint between the first wrist movable portion 12 and the upper arm 8 into turning about the R axis AxR relative to the leading end of the upper arm 8.

The second wrist movable portion 14 is supported by the leading end of the first wrist movable portion 12 while being turnable about a B axis AxB (which is a non-limiting example of the "first axis"). The B axis AxB is a turning axis approximately orthogonal to the R axis AxR. Specifically, the second wrist movable portion 14 is driven by two, first motor M and the second motor M (see FIGS. 3 and 4, described later) into turning about the B axis AxB relative to the leading end of the first wrist movable portion 12. The motors M and M are disposed in the first wrist movable portion 12.

The third wrist movable portion 16 is supported by the leading end of the second wrist movable portion 14 while being turnable about a T axis AxT (which is a non-limiting example of the "second axis"). The T axis AxT is a turning axis approximately orthogonal to the B axis AxB. Specifically, the third wrist movable portion 16 is driven by the first motor M and the second motor M into turning about the T axis AxT relative to the leading end of the second wrist movable portion 14. On the leading end of the third wrist movable portion 16, an end effector (not illustrated) is mounted.

The robot 1 will not be limited to the above-described configuration but may have any other configuration. Another possible configuration is that the turning axes of the movable portions of the arm 3 have other than the above-described directions. Still another possible embodiment is that the number of the movable portions of the wrist 10 and the number of the movable portions of the arm 3 are other than three or six. Still another possible embodiment is that the robot 1 is a multi-arm robot with a plurality of arms 3, instead of being a single-arm robot with a single arm 3. Still another possible embodiment is that the robot 1 is a horizontal multi-articular robot or any other type of robot than a vertical multi-articular robot.

The controller CT is connected to the robot 1 in a mutually communicative manner to control the robot 1. For example, the controller CT controls the robot 1 to drive the motors of the robot 1 so as to move the movable portions of the arm 3 desirably.

1-2. Exemplary Configuration of Wrist

Next, an exemplary configuration of the wrist 10 will be described by referring to FIGS. 2 to 10.

As illustrated in FIGS. 2 to 5, the wrist 10 includes the first wrist movable portion 12, the second wrist movable portion 14, the third wrist movable portion 16, the first motor M and the second motor M, and a motive power transferer PS. The second wrist movable portion 14 and the third wrist movable portion 16 each have a hollow structure.

1-2-1. Examples of First to Third Wrist Movable Portions

The first wrist movable portion 12 includes a frame 30 (which is a non-limiting example of the "arm frame").

The frame 30 is implemented by connecting two frames 300a and 300b to each other. The frames 300a and 300b are a plane symmetry with respect to a plane that is approximately orthogonal to the B axis AxB and that extends along the R axis AxR. The frame 30 includes a flange 31 and an elongated portion 32. The flange 31 is connected to the leading end of the upper arm 8. The elongated portion 32 extends in the R axis AxR direction.

The elongated portion 32 has a depressed cross-section on its two sides in the B axis AxB direction. On both sides in the B axis AxB direction, the elongated portion 32 is covered by frame covers FC and FC. The elongated portion 32 includes a pair of holders 33 and 33. The pair of holders 33 and 33 face each other in the B axis AxB direction with a space defined between the pair of holders 33 and 33.

The pair of holders 33 and 33 have a furcated shape; in other words, the elongated portion 32 branches at a portion slightly off the middle portion of the elongated portion 32 toward its base end, and the branches extend toward the leading end of the elongated portion 32. The second wrist movable portion 14 is supported by and disposed between the leading ends of the pair of holders 33 and 33 while being turnable about the B axis AxB. Each holder 33 has a supporting region that supports the second wrist movable portion 14. The supporting region corresponds to the movable range of the second wrist movable portion 14, and is implemented by a thinner portion 34. The thinner portion 34 is smaller in thickness in the B axis AxB direction than the other region (non-supporting region) of each holder 33.

A shaft 35 is disposed in the thinner portion 34. The shaft 35 protrudes in the B axis AxB direction and has a hollow extending in the B axis AxB direction.

The second wrist movable portion 14 includes a frame 40.

The frame 40 includes a pair of supported portions 42 and 42 and an elongated portion 41. The pair of supported portions 42 and 42 are disposed between the thinner portions 34 and 34 and face each other in the B axis AxB direction with a space defined between the pair of supported portions 42 and 42. The elongated portion 41 extends in the T axis AxT direction.

Each supported portion 42 is depressed on the outer side in the B axis AxB direction. Each supported portion 42 accommodates the shaft 35 with a bearing Be6 and a housing Ho. Specifically, on an outer end portion of each supported portion 42 in the B axis AxB direction, the housing Ho is mounted with the bearing Be6 on the inner circumference of the housing Ho. The inner ring of the bearing Be6 is fixed to the outer circumference of the shaft 35.

A shaft 44 is fixed to a bottom portion of each supported portion 42. The shaft 44 is passed through the shaft 35 with bearings Be7 and Be8 on the outer circumference of the shaft 44.

To the shaft 44, one end of a thrust bearing Be12 (for example, a thrust needle bearing) is connected through a cap 45. The thrust bearing Be12 is supported by the thinner portion 34 while being turnable about the B axis AxB.

The elongated portion 41 has a hollow extending in the T axis AxT direction. On the inner circumference of the elongated portion 41, bearings Be10 and Be11 are disposed.

With this configuration, the second wrist movable portion 14 is supported by the bearings Be6 to Be8 while being turnable about the B axis AxB.

The third wrist movable portion 16 has a hollow extending in the T axis AxT direction, and is connected to the shaft of a second bevel gear BG2, which is disposed in the elongated portion 41 as described later. Thus, the third wrist movable portion 16 is turnable about the T axis AxT together with the second bevel gear BG2.

The first wrist movable portion 12, the second wrist movable portion 14, and the third wrist movable portion 16 will not be limited to the above-described configurations but may have any other configurations.

1-2-2. Example of Motor

The first motor M and the second motor M are respectively contained in motor containers 36 and 36. The motor containers 36 and 36 are disposed at two sides in the B axis AxB direction of a base-end portion of the elongated portion 32 that is opposite to the second wrist movable portion 14 in the direction in which the elongated portion 32 extends. In the following description, the "first motor M" refers to the motor M contained in the frame 300a-side motor container 36, and the "second motor M" refers to the motor M contained in the frame 300b-side motor container 36.

Each motor M has a shaft extending in the R axis AxR direction. By rotating the shaft about a rotation axis Ax1, which extends along the R axis AxR, the motor M outputs motive power.

The motor container 36 may not necessarily be disposed at the base end of the elongated portion 32. In another possible embodiment, the motor container 36 is disposed at or around the center of the elongated portion 32 in the direction in which the elongated portion 32 extends. In still another possible embodiment, the motor container 36 is disposed at the leading end of the elongated portion 32.

1-2-3. Example of Motive Power Transferer

The motive power transferer PS includes a plurality of gears to transfer the motive power of the first motor M and the motive power of the second motor M to at least one wrist movable portion among the second wrist movable portion 14 and the third wrist movable portion 16. The motive power transferer PS includes two spur gears SG1 and SG1, two spur gears SG2 and SG2, two hypoid pinions HP and HP, two hypoid gears HG and HG, two spur gears SG3 and SG3, two spur gears SG4 and SG4, two spur gears SG5 and SG5, and an interference driver IS. Specifically, one spur gear SG1, one spur gear SG2, one hypoid pinion HP, one hypoid gear HG, one spur gear SG3, one spur gear SG4, and one spur gear SG5 are disposed in the frame 300a, and the other spur gear SG1, the other spur gear SG2, the other hypoid pinion HP, the other hypoid gear HG, the other spur gear SG3, the other spur gear SG4, and the other spur gear SG5 are disposed in the frame 300b.

The spur gear SG1 is supported by and connected to the shaft of the motor M while being turnable about the rotation axis Ax1.

The spur gear SG2 is supported by and meshed with the spur gear SG1 while being turnable about a turning axis Ax2, which extends along the rotation axis Ax1.

The hypoid pinion HP has its shaft fitted with the through hole of the spur gear SG2 and thus is connected to the spur gear SG2. The hypoid pinion HP is supported by bearings Be1 and Be2 while being turnable about the turning axis Ax2.

The hypoid gear HG is bolted to the spur gear SG3 and thus is integral to the spur gear SG3. The hypoid gear HG is supported by a bearing Be4 and a thrust bearing Be3 (for example, thrust needle bearing) while being turnable about the turning axis Ax3, which extends along the B axis AxB. The hypoid gear HG is meshed with the hypoid pinion HP.

The thrust bearing Be3 is disposed on the inner side of the hypoid gear HG in the B axis AxB direction to receive the force of the hypoid gear HG acting in the turning axis Ax3 direction. On the inner side of the thrust bearing Be3 in the B axis AxB direction, a shim sm (which is a non-limiting example of the "means for regulating a backlash between the hypoid pinion and the hypoid gear") is disposed. The shim sm adjusts the position of the hypoid gear HG in the turning axis Ax3 direction.

The spur gear SG3 has its shaft fitted with the inner circumference of the hypoid gear HG and thus is connected to the hypoid gear HG. The spur gear SG3 is supported by the bearing Be4 while being turnable about the turning axis Ax3.

In this embodiment, in each of the frames 300a and 300b, the spur gear SG2, the hypoid pinion HP, the hypoid gear HG, the thrust bearing Be3, the shim sm, the spur gear SG3, and/or other elements make up a unit referred to as gear unit GU.

1-2-3-1. Example of Gear Unit

The gear units GU and GU are respectively mounted on unit mounting portions 37 and 37. The unit mounting portions 37 and 37 are disposed at two sides in the B axis AxB direction of a portion of the elongated portion 32 that is closer to the leading end of the elongated portion 32 than the motor container 36 is to the leading end and that is closer to the base end of the elongated portion 32 than the thinner portion 34 is to the base end.

As illustrated in FIGS. 3 to 9, the gear unit GU is a unit of two planar frames 50 and 51 (which are non-limiting examples of the gear frame recited in the appended claims), a frame 52, the spur gear SG2, the hypoid pinion HP, the hypoid gear HG, the shim sm, the spur gear SG3, and/or other elements.

The frames 50 and 51 are made of iron or a similar material higher in strength, and face each other in the B axis AxB direction with a space defined between the frames 50 and 51.

The frame 52 is made of aluminum or a similar material, and is held between the frames 50 and 51 and fixed to the frames 50 and 51.

The hypoid pinion HP is, in large part, disposed in the space defined by the frames 50, 51, and 52, and is supported by the bearings Be1 and Be2 while being turnable about the turning axis Ax2. The bearings Be1 and Be2 are disposed on one side of the space defined between the frames 50 and 51, that is, the base end side of the frames 50 and 51.

The spur gear SG2 is disposed outside the frames 50, 51, and 52 and fitted with the shaft of the hypoid pinion HP. The spur gear SG2 is supported by the shaft of the hypoid pinion HP while being turnable about the turning axis Ax2.

The hypoid gear HG is supported by the thrust bearing Be3 while being turnable about the turning axis Ax3. The thrust bearing Be3 is disposed on the other side of the space defined between the frames 50 and 51, that is, the leading end side of the frames 50 and 51.

The shim sm is disposed between the frame 51 and the thrust bearing Be3. The shim sm is used to adjust the position of the hypoid gear HG in the turning axis Ax3 direction. This ensures that a backlash at the portion at which the hypoid pinion HP and the hypoid gear HG are meshed with each other is regulated.

The spur gear SG3 is fitted with the inner circumference of the hypoid gear HG on the leading end side of the space defined between the frames 50 and 51, and is supported by the bearing Be4 while being turnable about the turning axis Ax3.

The gear unit GU will not be limited to the above-described configuration but may have any other configuration. For example, at least one of the spur gears SG2 and SG3 may not necessarily be included in the gear unit GU.

Figure 3:
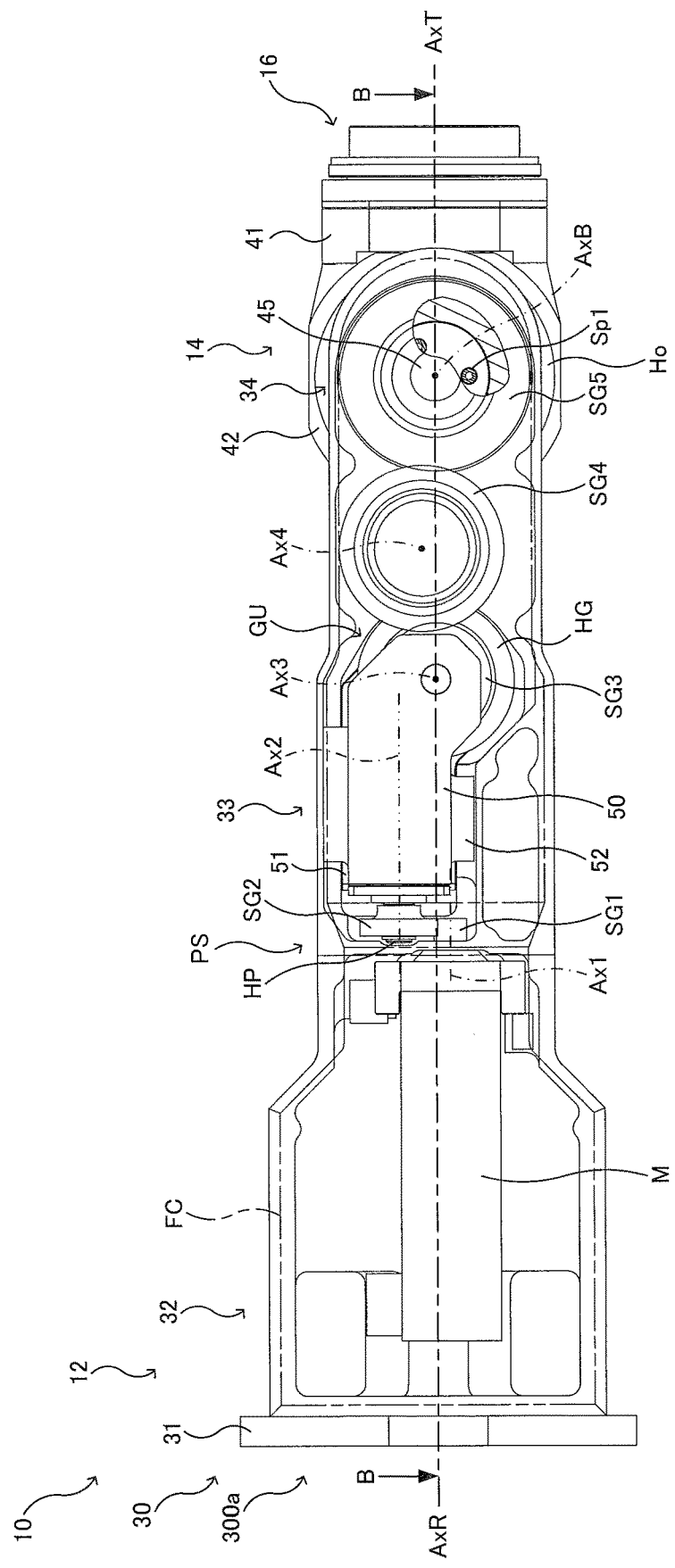
FIG. 3 is a phantom view of a frame cover seen from the direction indicated by arrow A illustrated in FIG. 2.
Figure 4:
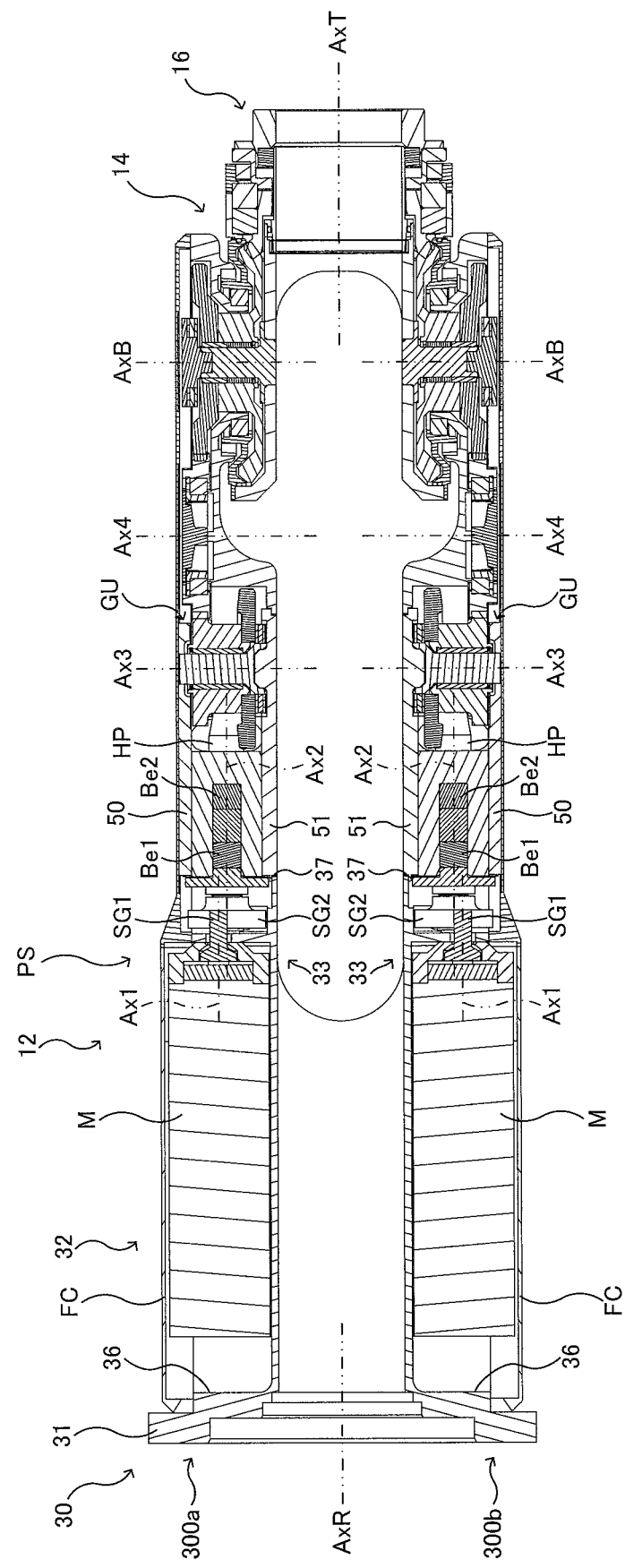
FIG. 4 is a cross-sectional view of the frame cover taken on the line B-B illustrated in FIG. 3.
Figure 5:
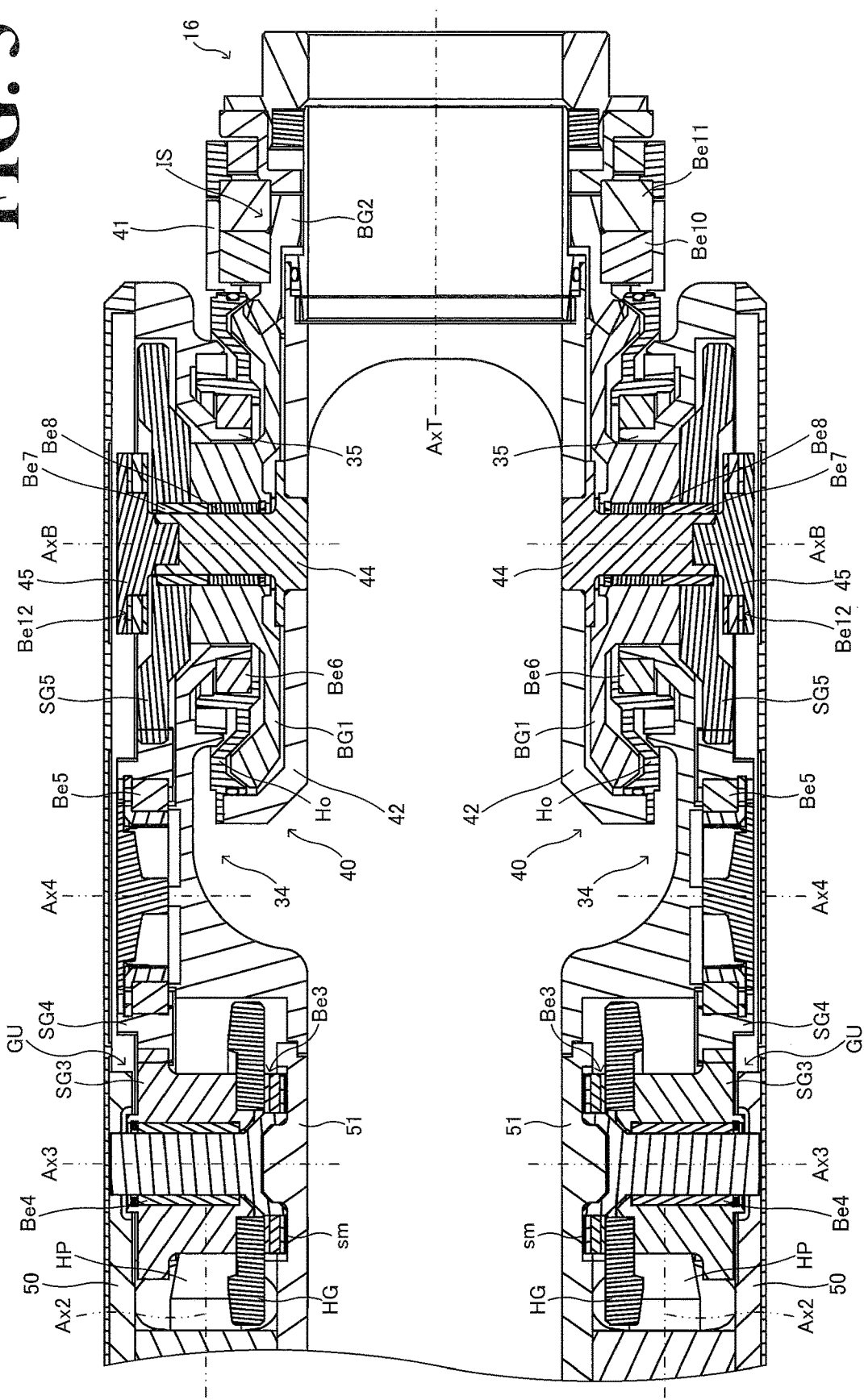
FIG. 5 is a partially enlarged view of the leading end of the wrist illustrated in FIG. 4.
Figure 6:
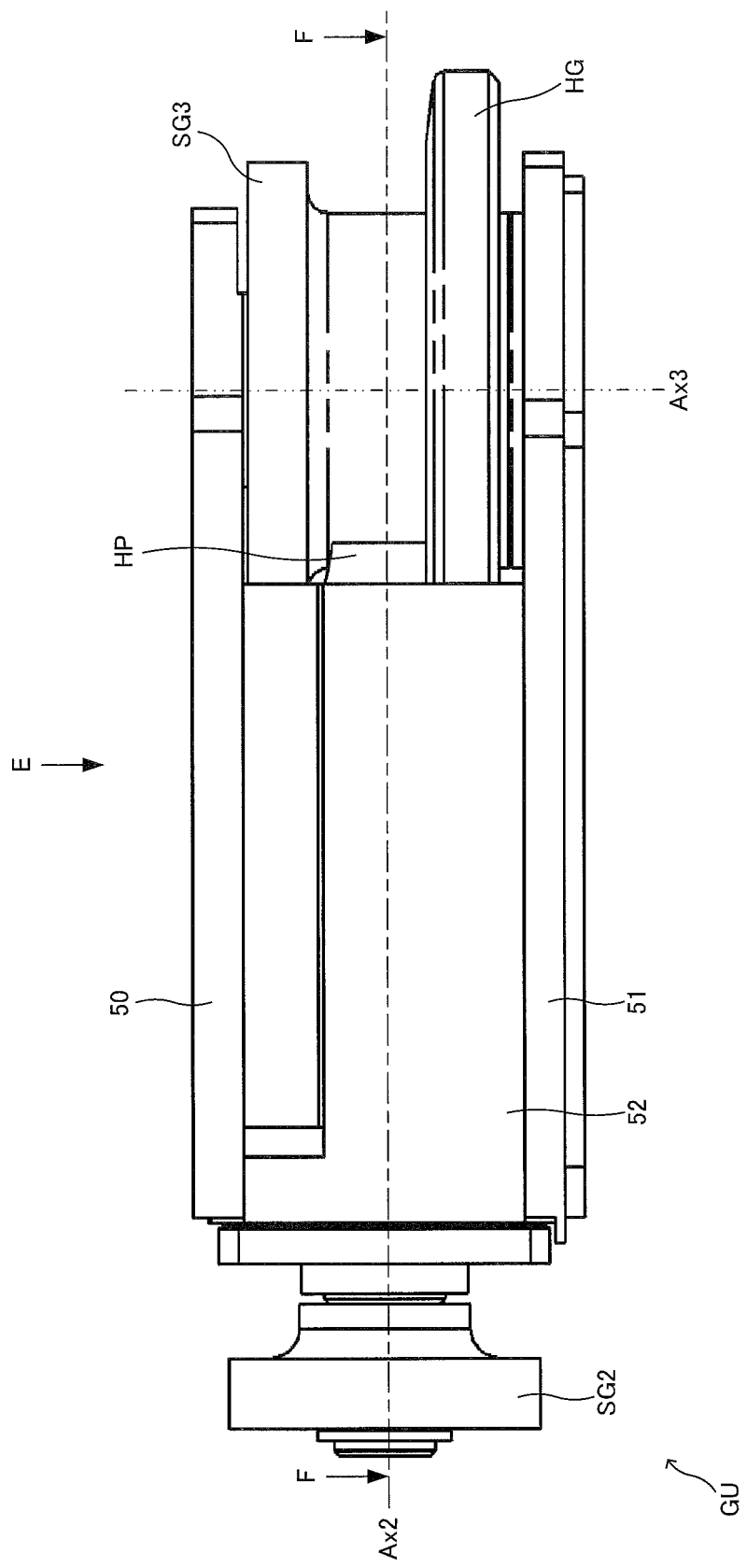
FIG. 6 is a plan view of a gear unit illustrating its exemplary configuration.
Figure 7:
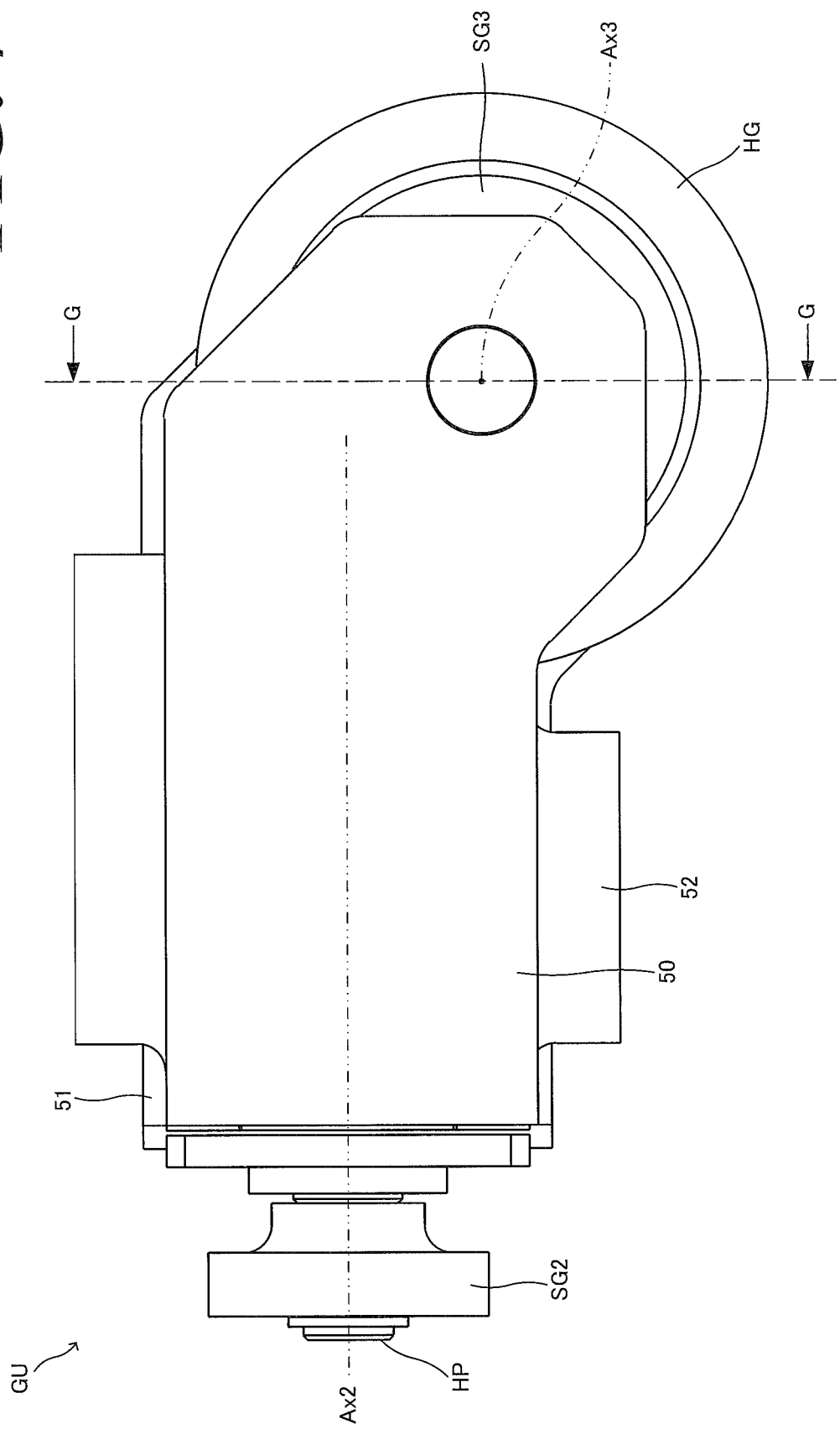
FIG. 7 is a side view of the gear unit seen from the direction indicated by arrow E illustrated in FIG. 6.
Figure 8:
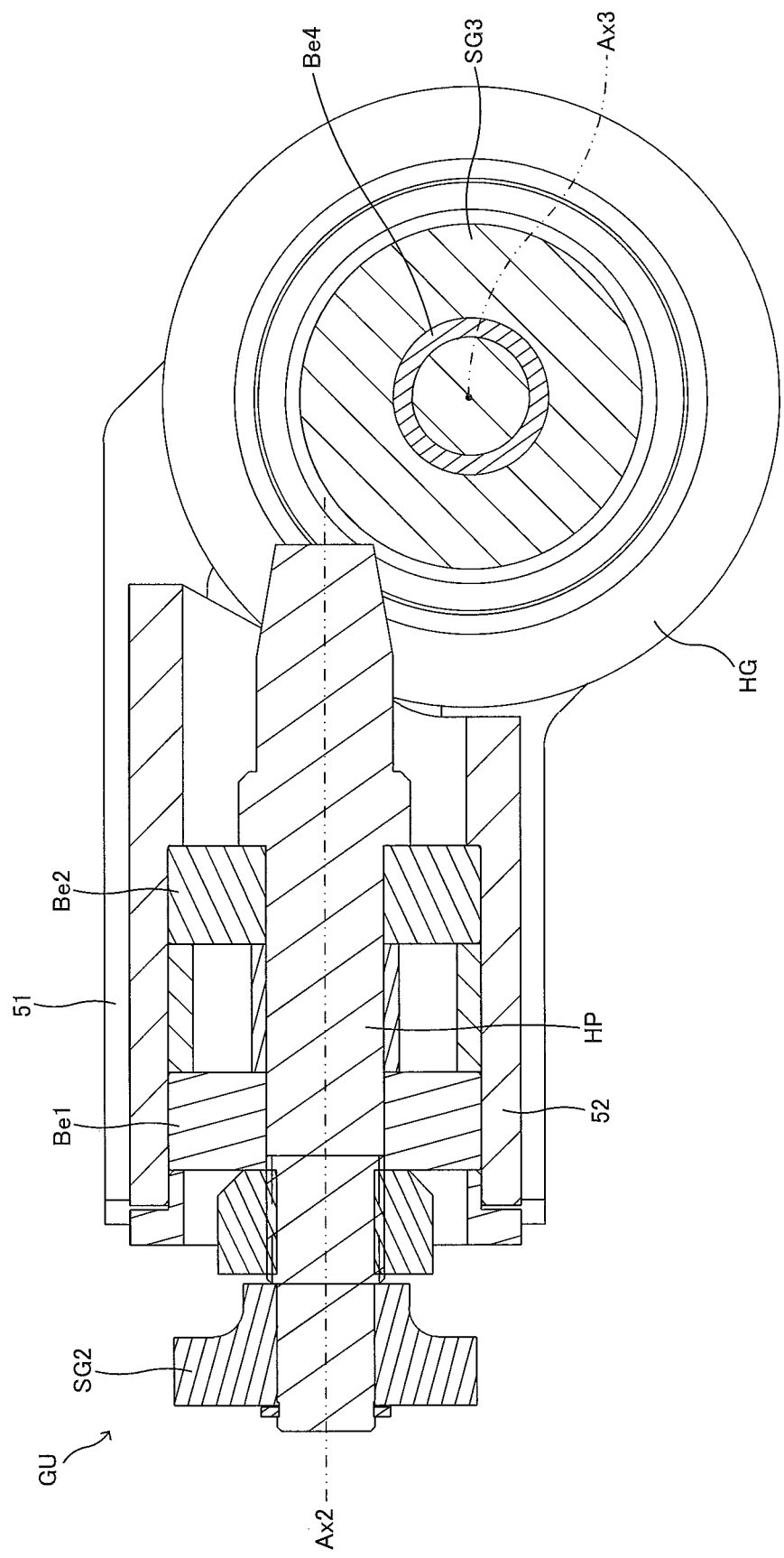
FIG. 8 is a cross-sectional view of the gear unit taken on the line F-F illustrated in FIG. 6.
Figure 9:
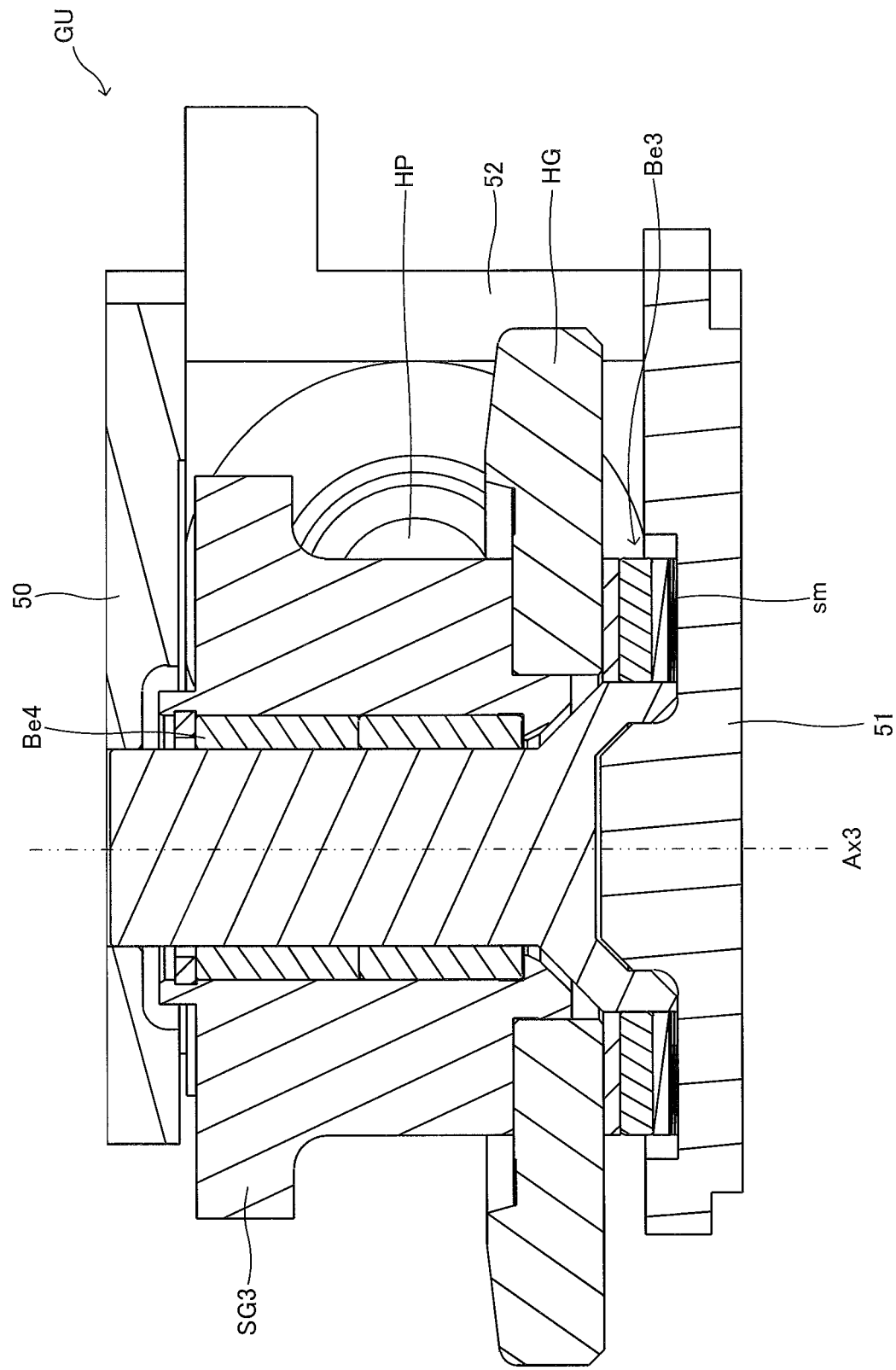
FIG. 9 is a cross-sectional view of the gear unit taken on the line G-G illustrated in FIG. 7.

As illustrated in FIGS. 3 to 5, the spur gear SG4 is disposed in the thinner portion 34. The spur gear SG4 is meshed with the spur gear SG3 and is supported by a bearing Be5 while being turnable about a turning axis Ax4, which extends in the B axis AxB direction.

The spur gear SG5 is disposed in the vicinity of the shaft 35 of the thinner portion 34. To the inner circumference of the spur gear SG5, the outer ring of the bearing Be7 is fixed. The spur gear SG5 is meshed with the spur gear SG4 and is supported by the bearing Be7 while being turnable about the B axis AxB. The spur gear SG5 is also connected to a first bevel gear BG1, which is included in the interference driver IS as described later.

The spur gears SG3 to SG5 are non-limiting examples of the "plurality of gears meshed with each other". The spur gear SG5 is a non-limiting example of the "gear connected to the first bevel gear".

In this embodiment, a backlash, if any, at the portions at which the spur gears SG3 and SG4 and the spur gears SG4 and SG5 are meshed with each other is regulated by the following non-limiting method.

Figure 10:
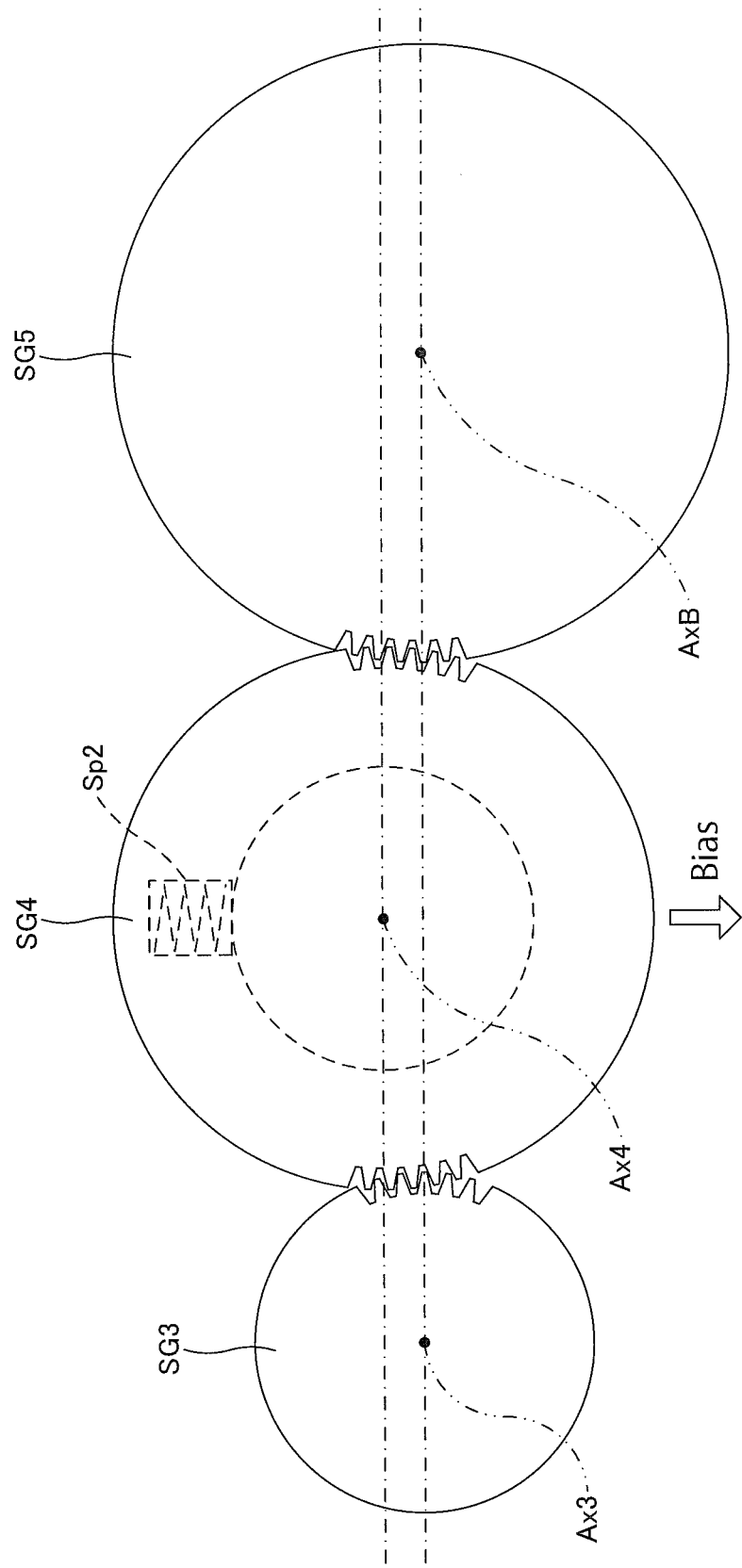
FIG. 10 schematically illustrates an exemplary backlash regulation, according to the first embodiment, of the portions at which a plurality of gears are meshed with each other.

1-2-3-2. Example of Regulation of Backlash at Portions at which Plurality of Gears are Meshed As illustrated in FIG. 10, the center of turning (turning axis Ax4) of the spur gear SG4 is shifted from the center of turning (turning axis Ax3) of the spur gear SG3 and the center of turning (B axis AxB) of the spur gear SG5 in one direction perpendicular to the turning axis Ax4 (in the upward direction in FIG. 10). In the vicinity of the shaft of the spur gear SG4, a spring Sp2 (which is a non-limiting example of the "second biasing member") is disposed. The spring Sp2 biases the spur gear SG4 in a surface direction perpendicular to the turning axis Ax4 (for example, in the direction indicated by the block arrow illustrated in FIG. 4).

By causing the spring Sp2 to bias the spur gear SG4 in a surface direction perpendicular to the turning axis Ax4, a pre-load results which presses the teeth of the spur gear SG4 against the teeth of the spur gears SG3 and SG5. This regulates the backlash at the portion at which the spur gears SG3 and SG4 are meshed with each other and the backlash at the portion at which the spur gears SG4 and SG5 are meshed with each other.

The method by which to regulate the backlashes at the portions at which the spur gears SG3 and SG4 and the spur gears SG4 and SG5 are meshed with each other will not be limited to the above-described method. For example, instead of or in addition to the spring Sp2 for the spur gear SG4, it is possible to provide at least one of the spur gear SG3 and spur gear SG5 with a spring, with some changes made in the spur gears SG3 to SG5 and associated structures so as to accommodate this spring.

1-2-3-3. Example of Interference Driver

As illustrated in FIGS. 3 to 5, the interference driver IS includes two first bevel gears BG1 and BG1 and the second bevel gear BG2.

Each first bevel gear BG1 has its shaft fixed to the shaft of the spur gear SG5 and thus is connected to the spur gear SG5. In the following description, the first bevel gear BG1 connected to the frame 300a-side spur gear SG5, that is, the first bevel gear BG1 that receives the motive power of the first motor M will be occasionally referred to as "one first bevel gear BG1", and the first bevel gear BG1 connected to the frame 300b-side spur gear SG5, that is, the first bevel gear BG1 that receives the motive power of the second motor M will be occasionally referred to as "another first bevel gear BG1".

To the inner circumference of the first bevel gear BG1, the outer rings of the bearings Be7 and Be8 are fixed. Thus, the first bevel gear BG1 is supported by the bearings Be7 and Be8 while being turnable about the B axis AxB. The force of the first bevel gear BG1 acting in the B axis AxB direction is received by the thrust bearing Be12.

The second bevel gear BG2 is disposed in the elongated portion 41. On the outer circumference of the shaft of the second bevel gear BG2, the inner rings of the bearings Be10 and Be11 are fixed. The second bevel gear BG2 is meshed with both the first bevel gears BG1 and BG1 and is supported by the bearings Be10 and Be11 while being turnable about the T axis AxT.

Between the first bevel gear BG1, the spur gear SG5, and the thrust bearing Be12, a plurality of springs Sp1 (which are non-limiting examples of the "first biasing member configured to bias the first bevel gear in the direction along the first axis") are disposed at equal intervals around the B axis AxB. The plurality of springs Sp1 bias the first bevel gear BG1 and the spur gear SG5 in the B axis AxB direction. By causing the plurality of springs Sp1 to bias the first bevel gear BG1 in the B axis AxB direction, a pre-load results which presses the teeth of the first bevel gear BG1 against the teeth of the second bevel gear BG2. This regulates the backlash at the portion at which the first bevel gear BG1 and the second bevel gear BG 2 are meshed with each other.

Instead of or in addition to the springs Sp1, which bias the first bevel gear BG1 in the B axis AxB direction, it is possible to provide a spring or a similar biasing member (which is a non-limiting example of the "first biasing member configured to bias the second bevel gear in the second axial direction") that biases the second bevel gear BG2 in the T axis AxT direction.

The shim sm and the springs Sp1 and Sp2 are non-limiting examples of the "means for regulating a backlash in the motive power transferer".

In this respect, the amount by which the one first bevel gear BG1 turns based on the motive power of the first motor M is denoted "θ", the amount by which the another first bevel gear BG1 turns based on the motive power of the second motor M is denoted "φ", the amount by which the second wrist movable portion 14 turns is denoted "r2", and the amount by which the third wrist movable portion 16 turns is denoted "r3". At a bevel gear ratio of 1:1, r2 and r3 can be represented by the following equation:

$$r2 = \frac{1}{2} \times (\theta + \phi)$$

$$r3 = \frac{1}{2} \times (\theta - \phi)$$

The interference driver IS and the motive power transferer PS will not be limited to the above-described configurations but may have any other configurations.

1-3. Example of Method for Producing Wrist

Next, an exemplary method for producing the above-described structure of the wrist 10 will be described.

In the production process (assembly process) of the wrist 10, gear units GU and GU are respectively mounted on the unit mounting portions 37 and 37 of the frame 30. Using the shim sm, the gear units GU and GU have already undergone the regulation of the backlash at the portion at which the hypoid pinion HP and the hypoid gear HG are meshed with each other.

Other elements than those described above are also mounted on the unit mounting portions 37 and 37, which will not be elaborated here. With all elements mounted on the unit mounting portions 37 and 37, the wrist 10 is complete.

1-4. Exemplary Advantageous Effects of First Embodiment

As has been described hereinbefore, the wrist 10 according to this embodiment includes means for regulating a backlash in the motive power transferer PS (in this embodiment, the means is implemented by the shim sm and the springs Sp1 and Sp2). The means eliminates the need for wave gears, which minimize the backlash in the motive power transferer PS, and necessary reduction gear ratios are obtained by connecting a plurality of gears, such as spur gears and bevel gears, to each other. This configuration ensures no or minimal speed restriction inherent in wave gears, increasing the speed of movement of the second wrist movable portion 14 and the third wrist movable portion 16. Additionally, the means for regulating a backlash in the motive power transferer PS (in this embodiment, the means is implemented by the shim sm and the springs Sp1 and Sp2) reduces the backlash of the gears of the motive power transferer PS, resulting in improved operation accuracy.

Also in the wrist 10, two motors M and M are used to cause the interference driver IS to move the second wrist movable portion 14 and the third wrist movable portion 16 independently. This configuration reduces the torque necessary from each one motor M as compared with the case where a single motor is used to move the second wrist movable portion 14 and the third wrist movable portion 16. This configuration, in turn, increases the rapidity of movement while using motors M each having reduced capacity, even if the reduction gear ratio is reduced for higher rapidity of movement. As a result, the wrist 10 is reduced in size and moves with higher rapidity at the same time.

Also in the first embodiment, the first biasing members (springs Sp1 in this embodiment) bias the first bevel gear BG1 in the B axis AxB direction, resulting in a pre-load causing the first bevel gear BG1 and the second bevel gear BG2 to press each other. As a result, the backlash is eliminated or minimized.

Also in the first embodiment, the springs Sp1 are disposed between the spur gear SG5, the first bevel gear BG1, and the thrust bearing Be12, and bias the spur gear SG5 and the first bevel gear BG1 in the B axis AxB direction. In order to bias the spur gear SG5 and the first bevel gear BG1, the springs Sp1 are disposed in the space defined between the thrust bearing Be12 and the bottom of the counterbore of the first bevel gear BG1. This configuration secures the lengths of the springs Sp1. This configuration, in turn, makes the spring force less dependent on displacement, stabilizing the pre-load. The stabilized pre-load makes stable the effect of reducing backlash. Additionally, the second bevel gear BG2 is meshed with two first bevel gears BG1 and BG1 on two sides of the second bevel gear BG2, and the springs Sp1 are disposed on each first bevel gear BG1. This configuration enables the springs Sp1 to be adjusted individually on each side of the second bevel gear BG2, minimizing the difference in the amount of spring pre-load between the springs Sp1 on one side of the second bevel gear BG2 and the springs Sp1 on the other side of the second bevel gear BG2. This configuration minimizes the difference in motive power transfer loss between the portion at which the second bevel gear BG2 is meshed with the one first bevel gear BG1 and the portion at which the second bevel gear BG2 is meshed with the other first bevel gear BG1, while at the same time minimizing variation of the motor torque. As a result, the motor torque is used effectively, resulting in improved operation performance.

Also in the first embodiment, the second biasing member (the spring Sp2 in this embodiment) biases the spur gear SG4 in a surface direction perpendicular to the turning axis Ax4, which extends along the B axis AxB. This configuration minimizes the backlashes at the portions at which the spur gears SG3 and SG4 and the spur gears SG4 and SG5 are meshed with each other.

Also in the first embodiment, the motive power transferer PS includes the hypoid pinions HP and the hypoid gears HG, and the shim sm is used to adjust the position of each hypoid gear HG in the direction of the turning axis Ax3, which extends along the B axis AxB. The presence of the hypoid gears HG in the motive power transferer PS increases the reduction gear ratio. In this respect, the hypoid gears HG become less efficient as the reduction gear ratio increases. In view of this, the motive power transferer PS includes such gears as bevel gears and spur gears each with optimized reduction gear ratio. This configuration improves the gear efficiency of the motive power transferer PS as a whole. As a result, each motor M is reduced in capacity and the wrist 10 is reduced in size. Additionally, the shim sm is used to adjust the position of the hypoid gear HG in the direction of the turning axis Ax3, which extends along the B axis AxB. This configuration minimizes the backlash at the portion at which the hypoid pinion HP and the hypoid gear HG are meshed with each other.

Also in the first embodiment, the motive power transferer PS includes the gear unit GU, which is a unit of the frames 50 and 51, the hypoid pinion HP, the hypoid gear HG, and the shim sm. Including the hypoid gear HG in a unit facilitates the automatic mounting of the motive power transferer PS onto the frame 30, resulting in improved productivity of the wrist 10. Also, the backlash in the gear unit GU alone can be regulated using the shim sm before the gear unit GU is assembled onto the wrist 10. This configuration improves backlash regulation accuracy and workability. This configuration also eliminates the need for wave gears, which minimize the backlash in the motive power transferer PS, and necessary reduction gear ratios are obtained by connecting a plurality of gears, such as spur gears and bevel gears, to each other, increasing the speed of movement of the second wrist movable portion 14 and the third wrist movable portion 16. Since the motive power transferer PS uses the gear unit GU having undergone backlash regulation with improved accuracy, operation accuracy improves. Due to a radial/thrust load between the hypoid pinion HP and the hypoid gear HG, internal stress occurs in the frames 50 and 51. This is addressed by using iron or a material higher in strength for the frames 50 and 51, making the frames 50 and 51 sufficiently small in thickness. This configuration reduces the dimension of the gear unit GU in the direction of the turning axis Ax3, which extends along the B axis AxB, making the wrist 10 smaller in thickness.

Also in the first embodiment, the frame 30 includes: the pair of holders 33 and 33, which face each other; and the second wrist movable portion 14, which is supported by and disposed between the leading ends of the pair of holders 33 and 33. This configuration ensures that a space is defined between the pair of holders 33 and 33 of the frame 30, enabling the wrist 10 to have a hollow structure through which various cables can be wired.

Also in the first embodiment, the structure that the second wrist movable portion 14 is supported between the leading ends of the pair of holders 33 and 33 of the frame 30 enables the wrist 10 to have a hollow structure due to the space defined between the pair of holders 33 and 33. In this respect, the thinner portion 34 corresponds to the supporting region of each holder 33 that supports the second wrist movable portion 14. This configuration makes smaller the outer dimension (joint width) of the wrist 10 in the B axis AxB direction as compared with the case where the holder 33 has a uniform thickness.

At the same time, the plurality of gears of the motive power transferer PS secure necessary reduction gear ratios between each motor M and the second wrist movable portion 14. This eliminates the need for a reducer between the holders 33 and the second wrist movable portion 14. This configuration secures the dimension of the second wrist movable portion 14 in the B axis AxB direction and secures a hollow diameter.

Thus, the wrist 10 has a hollow diameter while being smaller in thickness.

Also in the first embodiment, the supporting region of each holder 33, where the thinner portion 34 is disposed, corresponds to the movable range of the second wrist movable portion 14. This configuration secures a movable space for the second wrist movable portion 14.

Also in the first embodiment, the second wrist movable portion 14 and the third wrist movable portion 16 each have a hollow structure. This configuration allows various cables associated with the end effector to be wired through the wrist 10.

Also in the first embodiment, the frame 30 includes the motor containers 36 and 36, which are disposed at positions opposite to the second wrist movable portion 14 in the direction in which the frame 30 extends. The motor containers 36 and 36 respectively contain the motors M and M. Thus, the motors M and M, which are comparatively heavy objects, are kept away from the second wrist movable portion 14. This configuration reduces the load (inertia moment) of the wrist 10 imposed on the shafts positioned further on the base side than the wrist 10. This configuration, in turn, reduces the necessary amount of torque, reduces the capacities of the motors of the basic shafts, and reduces the frame in size and thickness. As a result, the shafts positioned further on the base side than the wrist 10 are reduced in size.

Also in the first embodiment, the spur gears SG4 and SG5 are disposed in the thinner portion 34. Among the elements of the motive power transferer PS, the spur gears SG4 and SG5 are smaller in tooth width. By arranging such spur gears SG4 and SG5 in the thinner portion 34, a thinner structure is implemented.

In the structure of the wrist 10 that the second wrist movable portion 14 is supported by and disposed between the leading ends of the pair of holders 33 and 33, the structure that the thinner portion 34 constitutes the supporting region of each holder 33 that supports the second wrist movable portion 14 is not an essential structure to obtain the advantageous effect of increasing the speeds of movement of the second wrist movable portion 14 and the third wrist movable portion 16. Also, the means for regulating a backlash in the motive power transferer PS (in this embodiment, the means is implemented by the shim sm and the springs Sp1 and Sp2) is not an essential structure of the wrist 10 to obtain the advantageous effect of enabling the wrist 10 to have a hollow diameter while making the wrist 10 smaller in thickness.

1-5. Modifications

Modifications of the first embodiment will be described below.

1-5-1. First Modification

In the first embodiment, the spring Sp2 biases the spur gear SG4 in a surface direction perpendicular to the turning axis Ax4 so as to regulate the backlashes at the portions at which the spur gears SG3 to SG5 are meshed with each other.

Figure 11:
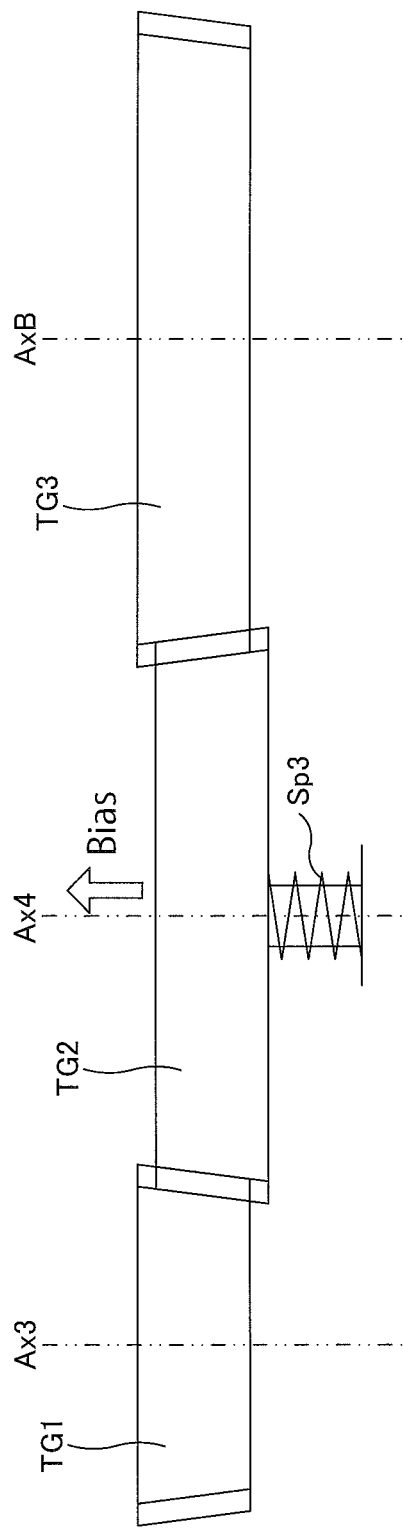
FIG. 11 schematically illustrates an exemplary backlash regulation, according to a first modification, of the portions where the plurality of gears are meshed with each other.

In the first modification illustrated in FIG. 11, a taper gear TG1 is provided instead of the spur gear SG3; a taper gear TG2 is provided instead of the spur gear HG4; and a taper gear TG3 is provided instead of the spur gear HG5. The taper gears TG1 to TG3 are non-limiting examples of the "plurality of gears meshed with each other".

As illustrated in FIG. 11, a spring Sp3 (which is a non-limiting example of the "second biasing member") is disposed on the shaft of the taper gear TG2. The spring Sp3 biases the taper gear TG2 in the turning axis Ax4 direction (for example, in the direction indicated by the block arrow illustrated in FIG. 11). One end of the spring Sp3 is fixed to the B axis AxB-direction side of the taper gear TG2, and the other end of the spring Sp3 is fixed to the outer surface of the thinner portion 34.

By causing the spring Sp3 to bias the taper gear TG2 in the turning axis Ax4 direction, a pre-load results which presses the teeth of the taper gear TG2 against the teeth of the taper gear TG1 and TG 3. This regulates the backlash at the portion at which the taper gear TG1 and TG 2 are meshed with each other and the backlash at the portion at which the taper gear TG2 and TG 3 are meshed with each other. The spring Sp3 is a non-limiting example of the "means for regulating a backlash in the motive power transferer".

The method by which to regulate the backlashes at the portions at which the taper gears TG1 and TG2 and the taper gears TG2 and TG3 are meshed with each other will not be limited to the above-described method. For example, instead of or in addition to the spring Sp2 for the taper gear TG2, it is possible to provide at least one of the taper gear TG1 and the taper gear TG3 with a spring.

The first modification provides advantageous effects similar to the advantageous effects provided by the first embodiment. Specifically, the first modification minimizes the backlashes at the portions at which the taper gears TG1 and TG2 and the taper gears TG2 and TG3 are meshed with each other.

1-5-2. Second Modification

In the second modification illustrated in FIG. 12, a helical gear HG1 is provided instead of the spur gear SG3; a pair of helical gears HG2a and HG2b are provided instead of the spur gear HG4 (the pair of helical gears HG2a and HG2b will be hereinafter collectively referred to as "helical gear HG2"; and a helical gear HG3 is provided instead of the spur gear HGS. The helical gears HG1, HG2a, HG2b, and HG3 are non-limiting examples of the "plurality of gears meshed with each other".

Figure 12:
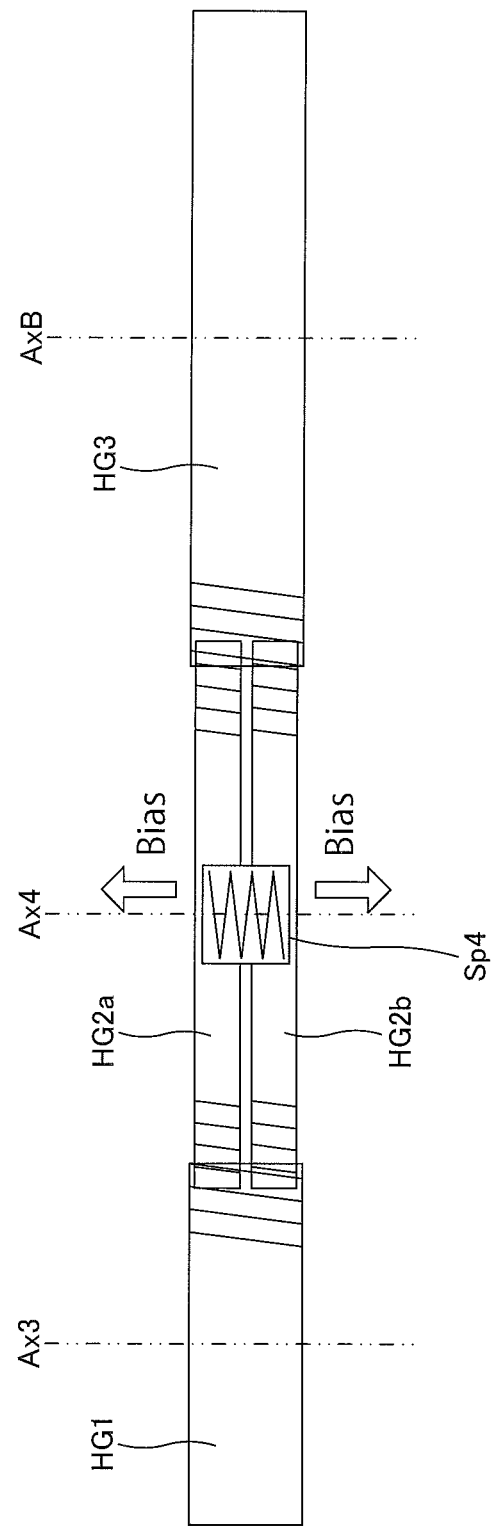
FIG. 12 schematically illustrates an exemplary backlash regulation, according to a second modification, of the portions where the plurality of gears are meshed with each other.

As illustrated in FIG. 12, a spring Sp4 (which is a non-limiting example of the "second biasing member") is disposed between the helical gears HG2a and HG2b. The spring Sp4 biases the helical gears HG2a and HG2b outward in the turning axis Ax4 directions (for example, in the directions indicated by the block arrows illustrated in FIG. 12).

By causing the spring Sp4 to bias the helical gears HG2a and HG2b outward in the turning axis Ax4 directions, a pre-load results which presses the teeth of one helical gear HG2 among the helical gears HG2a and HG2b against the helical gear HG1 and which presses the teeth of the other helical gear HG2 among the helical gears HG2a and HG2b against the helical gear HG3. This regulates the backlash at the helical gears HG1 and HG2 and the backlash at the helical gears HG2 and HG3. The spring Sp4 is a non-limiting example of the "means for regulating a backlash in the motive power transferer".

The method by which to regulate the backlashes at the portions at which the helical gears HG1 and HG2 and the helical gears HG2 and HG3 are meshed with each other will not be limited to the above-described method.

The second modification provides advantageous effects similar to the advantageous effects provided by the first embodiment. Specifically, the second modification minimizes the backlashes at the portions at which the helical gears HG1 and HG2 and the helical gears HG2 and HG3 are meshed with each other.

2. Second Embodiment

A second embodiment will be described. The following description will be concerning those respects in which the second embodiment is different from the first embodiment.

One difference between the second embodiment and the first embodiment is the configuration of the wrist. By referring to FIGS. 13 to 15, an exemplary configuration of the wrist according to the second modification will be described below.

2-1. Exemplary Configuration of Wrist

Figure 13:
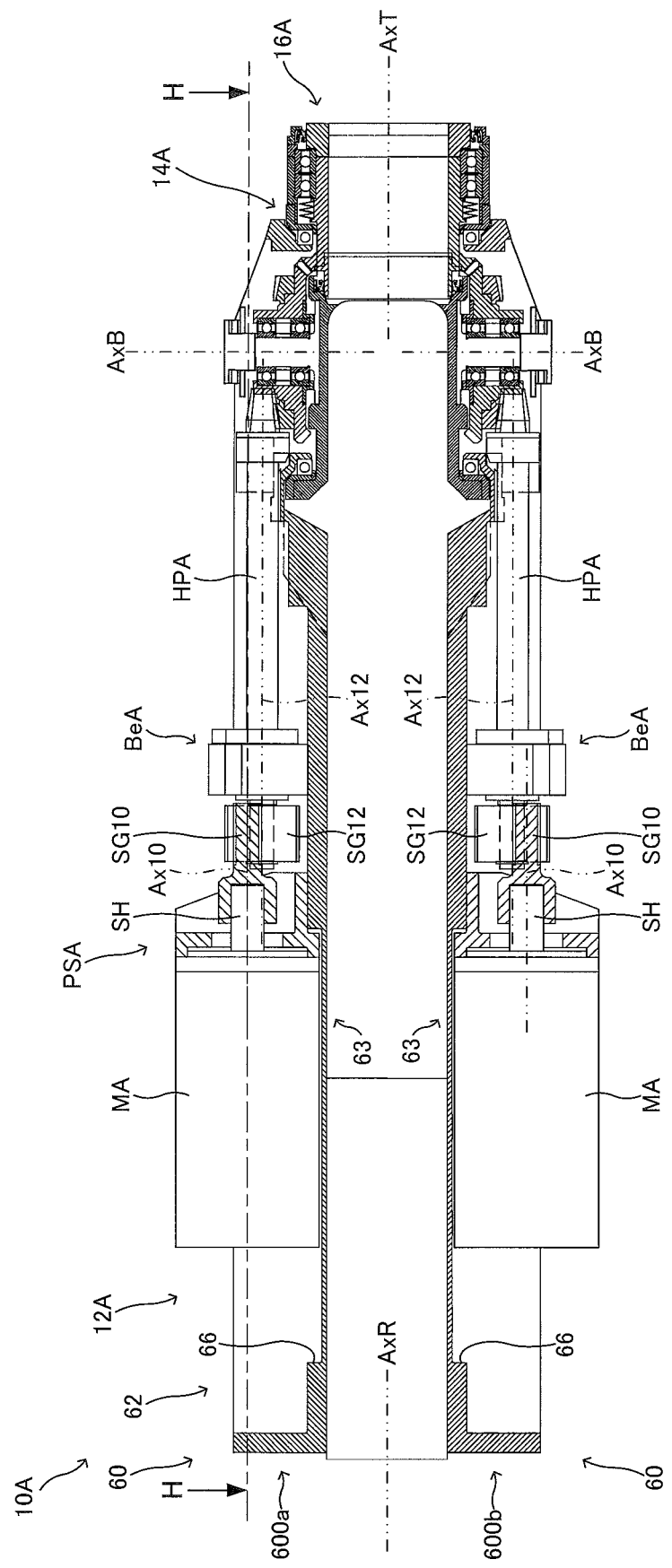
FIG. 13 is a cross-sectional view of a wrist according to a second embodiment illustrating an exemplary configuration of the wrist.
Figure 14:
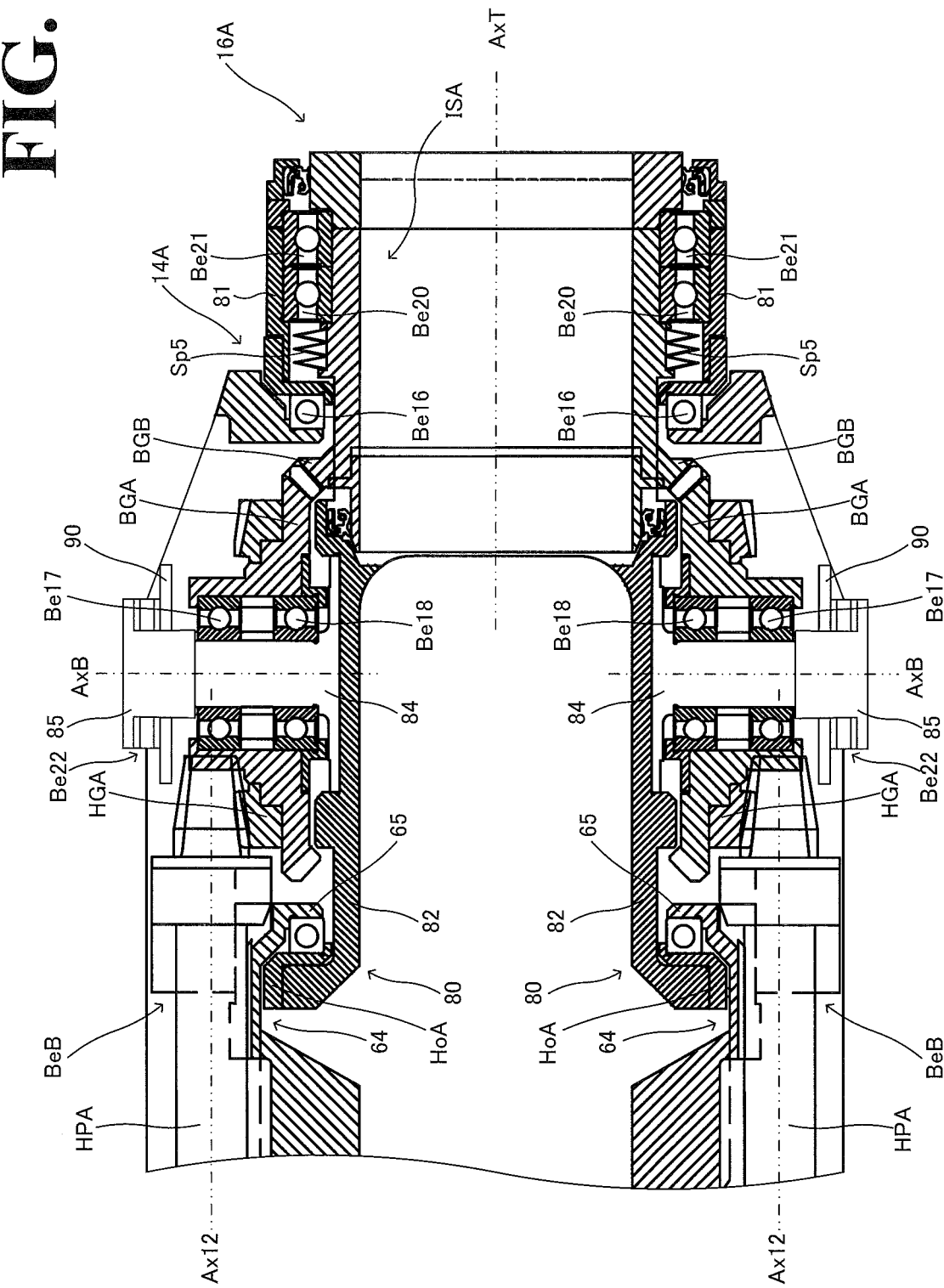
FIG. 14 is a partially enlarged view of the leading end of the wrist illustrated in FIG. 13.
Figure 15:
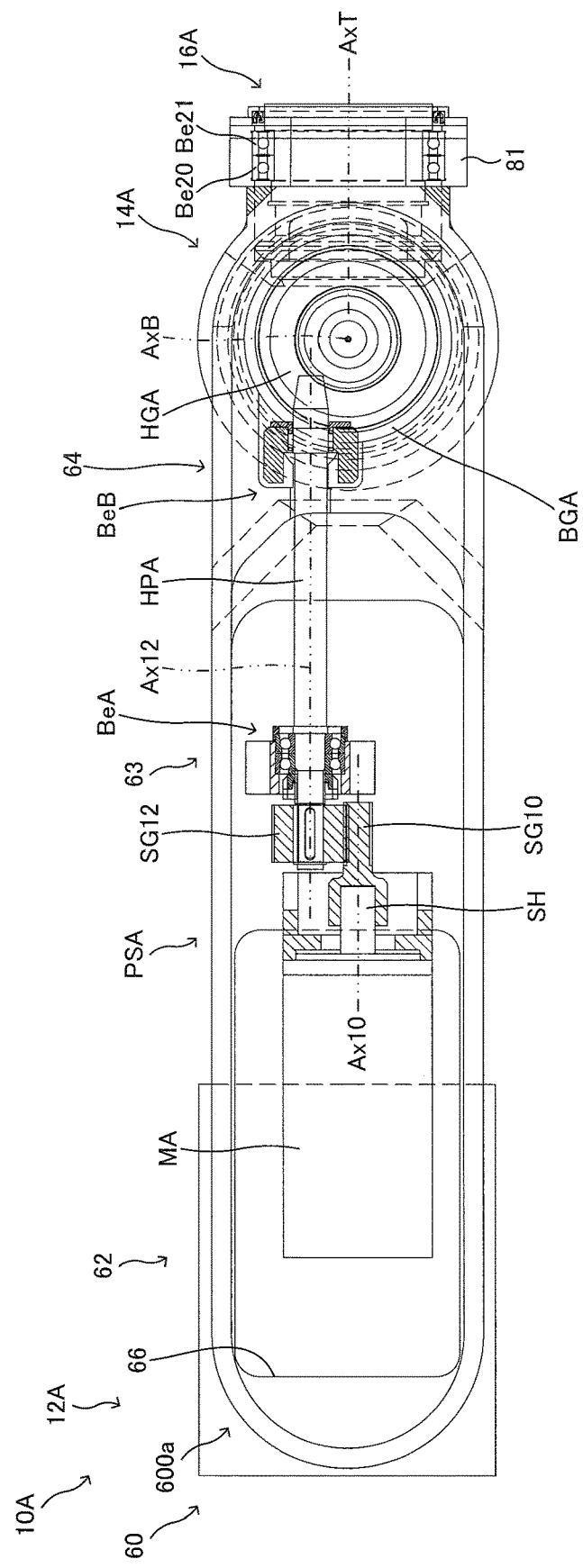
FIG. 15 is a cross-sectional view of the wrist taken on the line H-H illustrated in FIG. 13.

As illustrated in FIGS. 13 to 15, a wrist 10A (which is a non-limiting example of the "robot arm") according to the second modification includes a first wrist movable portion 12A, a second wrist movable portion 14A (which is a non-limiting example of the "first axis movable portion"), a third wrist movable portion 16A (which is a non-limiting example of the "second axis movable portion"), a first motor MA, a second motor MA, and a motive power transferer PSA. The second wrist movable portion 14A and the third wrist movable portion 16A each have a hollow structure.

2-1-1. Examples of First to Third Wrist Movable Portions

The first wrist movable portion 12A includes a frame 60 (which is a non-limiting example of the "arm frame").

The frame 60 is implemented by connecting two frames 600a and 600b to each other. The frames 600a and 600b are a plane symmetry with respect to a plane that is approximately orthogonal to the B axis AxB and that extends along the R axis AxR. The frame 60 includes an elongated portion 62. The elongated portion 62 extends in the R axis AxR direction.

The elongated portion 62 has a depressed cross-section on its two sides in the B axis AxB direction. On both sides in the B axis AxB direction, the elongated portion 62 is covered by frame covers (not illustrated). The elongated portion 62 includes a pair of holders 63 and 63. The pair of holders 63 and 63 face each other in the B axis AxB direction with a space defined between the pair of holders 63 and 63.

The second wrist movable portion 14A is supported by and disposed between the leading ends of the holders 63 and 63 while being turnable about the B axis AxB. Each holder 63 has a supporting region that supports the second wrist movable portion 14A. The supporting region corresponds to the movable range of the second wrist movable portion 14A, and is implemented by a thinner portion 64. The thinner portion 64 is smaller in thickness in the B axis AxB direction than the other region (non-supporting region) of each holder 63.

A shaft 65 is disposed in the thinner portion 64. The shaft 65 protrudes in the B axis AxB direction and has a hollow extending in the B axis AxB direction.

The second wrist movable portion 14A includes a frame 80.

The frame 80 includes a pair of supported portions 82 and 82 and an elongated portion 81. The pair of supported portions 82 and 82 are disposed between the thinner portion 64 and 64 and face each other in the B axis AxB direction with a space defined between the pair of supported portions 82 and 82. The elongated portion 81 extends in the T axis AxT direction.

Each supported portion 82 is depressed on the outer side in the B axis AxB direction. Each supported portion 82 accommodates the shaft 65. Specifically, on an outer end portion of each supported portion 82 in the B axis AxB direction, a housing HoA is mounted with a bearing Be16 on the inner circumference of the housing HoA. The inner ring of the bearing Be16 is fixed to the outer circumference of the shaft 65.

A shaft 84 is fixed to a bottom portion of each supported portion 82. The shaft 84 is passed through the shaft 65 with bearings Be17 and Be18 on the outer circumference of the shaft 84.

To the shaft 84, one end of a thrust bearing Be22 (which is a non-limiting example of the "frame retainer", and an example of which is a thrust needle bearing) is connected through a cap 85. The thrust bearing Be22 is supported by the thinner portion 64 while being turnable about the B axis AxB. The other end of the thrust bearing Be22 is fixed to the outer surface of the thinner portion 34 through a support 90. The thrust bearing Be22 receives the force acting in the B axis AxB direction to keep pressing the outer surface of the thinner portion 34.

The elongated portion 81 has a hollow extending in the T axis AxT direction. On the inner circumference of the elongated portion 81, bearings Be20 and Be21 are disposed.

With this configuration, the second wrist movable portion 14A is supported by the bearings Be16 to Be18 while being turnable about the B axis AxB.

The third wrist movable portion 16A has a hollow extending in the T axis AxT direction, and is connected to the shaft of a second bevel gear BGB, which is disposed in the elongated portion 81 as described later. Thus, the third wrist movable portion 16A is turnable about the T axis AxT together with the second bevel gear BGB.

The first wrist movable portion 12A, the second wrist movable portion 14A, and the third wrist movable portion 16A will not be limited to the above-described configurations but may have any other configurations.

2-1-2. Example of Motor

The first motor MA and the second motor MA are respectively contained in motor containers 66 and 66. The motor containers 66 and 66 are disposed at two sides in the B axis AxB direction of a base-end portion of the elongated portion 62 that is opposite to the second wrist movable portion 14A in the direction in which the elongated portion 62 extends. In the following description, the "first motor MA" refers to the motor MA contained in the frame 600a-side motor container 66, and the "second motor MA" refers to the motor MA contained in the frame 600b-side motor container 66.

Each motor MA has a shaft SH, which extends in the R axis AxR direction. By rotating the shaft SH about a rotation axis Ax10, which extends along the R axis AxR, the motor MA outputs motive power.

The motor container 66 may not necessarily be disposed at the base end of the elongated portion 62. In another possible embodiment, the motor container 66 is disposed at or around the center of the elongated portion 62 in the direction in which the elongated portion 62 extends. In still another possible embodiment, the motor container 66 is disposed at the leading end of the elongated portion 62.

2-1-3. Example of Motive Power Transferer

The motive power transferer PSA includes a plurality of gears to transfer the motive power of the first motor MA and the motive power of the second motor MA to at least one wrist movable portion among the second wrist movable portion 14A and the third wrist movable portion 16A. The motive power transferer PSA includes two spur gears SG10 and SG10, two spur gears SG12 and SG12, two hypoid pinions HPA and HPA, two hypoid gears HGA and HGA, and an interference driver ISA. Specifically, one spur gear SG10, one spur gear SG12, one hypoid pinion HPA, and one hypoid gear HGA are disposed in the frame 600a, and the other spur gear SG10, the other spur gear SG12, and the other hypoid pinion HPA are disposed in the frame 600b.

The spur gear SG10 has its shaft fitted with the shaft SH of the motor MA and thus is supported by and connected to the shaft SH while being turnable about the rotation axis Ax10.

The spur gear SG12 is supported by and meshed with the spur gear SG10 while being turnable about a turning axis Ax12, which extends along the rotation axis Ax10.

The hypoid pinion HPA has its shaft fitted with the through hole of the spur gear SG12 and thus is connected to the spur gear SG12. The leading end of the hypoid pinion HPA is disposed in the thinner portion 64. The hypoid pinion HPA is supported by a bearing BeA (for example, angular bearing) and a bearing BeB (for example, needle bearing) while being turnable about the turning axis Ax12.

The bearing BeA is disposed at a position in each holder 63 that is closer to the base end of the holder 63 than the thinner portion 64 is to the base end of the holder 63. The bearing BeA supports the base end of the shaft of the hypoid pinion HPA. The bearing BeB is disposed in the thinner portion 64 and supports the leading end of the shaft of the hypoid pinion HPA.

The hypoid gear HGA is meshed with and supported by the hypoid pinion HPA while being turnable about the B axis AxB. Also, the hypoid gear HGA is connected to a first bevel gear BGA, which is disposed in the interference driver ISA as described later.

2-1-3-1. Example of Interference Driver

The interference driver ISA includes two first bevel gears BGA and BGA and the second bevel gear BGB.

Each first bevel gear BGA has its shaft fitted with the through hole of the hypoid gear HGA and thus is connected to the hypoid gear HGA. In the following description, the first bevel gear BGA connected to the frame 600a-side hypoid gear HGA, that is, the first bevel gear BGA that receives the motive power of the first motor MA will be occasionally referred to as "one first bevel gear BGA", and the first bevel gear BGA connected to the frame 600b-side hypoid gear HGA, that is, the first bevel gear BGA that receives the motive power of the second motor MA will be occasionally referred to as "another first bevel gear BGA".

To the inner circumference of the first bevel gear BGA, the outer rims of the bearings Be17 and Be18 are fixed. Thus, the first bevel gear BGA is supported by the bearings Be17 and Be18 while being turnable about the B axis AxB.

The second bevel gear BGB is disposed in the elongated portion 81. On the outer circumference of the shaft of the second bevel gear BGB, the inner rings of the bearings Be20 and Be21 are fixed. The second bevel gear BGB is meshed with both the first bevel gear BGA and BGA and is supported by the bearings Be20 and Be21 while being turnable about the T axis AxT.

On the outer circumference of the shaft of the second bevel gear BGB, a spring Sp5 (which is a non-limiting example of the "first biasing member configured to bias the second bevel gear in the second axial direction") is disposed. The spring Sp5 biases the second bevel gear BGB in the T axis AxT direction. By causing the spring Sp5 to bias the second bevel gear BGB in the T axis AxT direction, a pre-load results which presses the teeth of the second bevel gear BGB against the teeth of the first bevel gear BGA. This regulates the backlash at the portion at which the first bevel gear BGA and the second bevel gear BGB are meshed with each other.

Instead of or in addition to the spring Sp5, which biases the second bevel gear BGB in the T axis AxT direction, it is possible to provide a spring or a similar biasing member (which is a non-limiting example of the "first biasing member configured to bias the first bevel gear in the first axis direction") that biases the first bevel gear BGA in the B axis AxB direction.

The spring Sp5 is a non-limiting example of the "means for regulating a backlash in the motive power transferer".

In this respect, the amount by which the one first bevel gear BGA turns based on the motive power of the first motor MA is denoted "θA", the amount by which the another first bevel gear BGA turns based on the motive power of the second motor MA is denoted "φA", the amount by which the second wrist movable portion 14A turns is denoted "r2A", and the amount by which the third wrist movable portion 16A turns is denoted "r3A". At a bevel gear ratio of 1:1, r2A and r3A can be represented by the following equation:

$$r2A = \tfrac{1}{2} \times (\theta A + \phi A)$$

$$r3A = \tfrac{1}{2} \times (\theta A - \phi A)$$

The interference driver ISA and the motive power transferer PSA will not be limited to the above-described configuration but may have any other configuration.

2-2. Exemplary Advantageous Effects of Second Embodiment

The second embodiment provides advantageous effects similar to the advantageous effects provided by the first embodiment. For example, the wrist 10A includes means for regulating a backlash in the motive power transferer PSA (in this embodiment, the means is implemented by the spring Sp5). This configuration increases the speed of movement of the second wrist movable portion 14A and the third wrist movable portion 16A. In the structure that the second wrist movable portion 14A is disposed between and supported by the leading ends of the pair of holders 63 and 63 of the frame 60, the thinner portion 64 constitutes the supporting region of each holder 63 that supports the second wrist movable portion 14A. This configuration ensures that the wrist 10A has a hollow diameter while being smaller in thickness.

Also in the second embodiment, the spring Sp5 biases the second bevel gear BGB in the T axis AxT direction, causing a pre-load to occur. The pre-load causes the first bevel gear BGA and the second bevel gear BGB to press each other, resulting in minimized backlash.

Also in the second embodiment, among the elements of the motive power transferer PSA, a part of the shaft-shaped hypoid pinion HPA is disposed in the thinner portion 64. This configuration ensures that a thinner structure is implemented. The presence of the hypoid gears HGA in the motive power transferer PSA increases the reduction gear ratio. In this respect, the hypoid gears HGA become less efficient as the reduction gear ratio increases. In view of this, the motive power transferer PSA includes such gears as bevel gears and spur gears each with optimized reduction gear ratio. This configuration improves the gear efficiency of the motive power transferer PSA as a whole. As a result, each motor MA is reduced in capacity and the wrist 10A is reduced in size.

Also in the second embodiment, the bearing BeA, which supports the hypoid pinion HPA, is disposed in the thinner portion 64. Thus, the hypoid pinion HPA is supported in the vicinity of the hypoid gear HGA. This configuration increases rigidity against load such as the radial load acting on the hypoid pinion HPA.

The second embodiment provides the following additional advantageous effects. The thinner portion 64 of each holder 63 is comparatively low in rigidity and thus is deformable in an open direction due to, for example, radial load occurring at the hypoid gear HGA or centrifugal force caused by a load involved in the turning of the third wrist movable portion 16A about the T axis AxT. This might cause skipping to occur between the hypoid pinion HPA and the hypoid gear HGA. In this embodiment, however, the presence of the thrust bearing Be22 eliminates or minimizes deformation of the thinner portion 64. As a result, skipping is eliminated or minimized.

In the structure of the wrist 10A that the second wrist movable portion 14A is supported by and disposed between the leading ends of the pair of holders 63 and 63, the structure that the thinner portion 64 constitutes the supporting region of each holder 63 that supports the second wrist movable portion 14A is not an essential structure to obtain the advantageous effect of increasing the speeds of movement of the second wrist movable portion 14A and the third wrist movable portion 16A. Also, the means for regulating a backlash in the motive power transferer PSA (in this embodiment, the means is implemented by the springs Sp5) is not an essential structure of the wrist 10A to obtain the advantageous effect of enabling the wrist 10A to have a hollow diameter while making the wrist 10A smaller in thickness.

The second embodiment is not intended in a limiting sense.

3. Miscellaneous Notes

In a modification of the first embodiment, it is possible to use an additional thrust bearing similar to the thrust bearing Be12 as a frame retainer.

As used herein, the terms "perpendicular", "parallel", and "plane" may not necessarily mean "perpendicular", "parallel", and "plane", respectively, in a strict sense. Specifically, the terms "perpendicular", "parallel", and "plane" mean "approximately perpendicular", "approximately parallel", and "approximately plane", respectively, with design-related and production-related tolerance and error taken into consideration.

Also, when the terms "same", "equal", and "different" are used in the context of dimensions or sizes of external appearance, these terms may not necessarily mean "same", "equal", and "different", respectively, in a strict sense. Specifically, the terms "same", "equal", and "different" mean "approximately same", "approximately equal", and "approximately different", respectively, with design-related and production-related tolerance and error taken into consideration.

Otherwise, the above-described embodiments and modifications may be combined in any manner deemed suitable.

Obviously, numerous modifications and variations of the present disclosure are possible in light of the above teachings. It is therefore to be understood that within the scope of the appended claims, the present disclosure may be practiced otherwise than as specifically described herein.

What is claimed as new and desired to be secured by Letters Patent of the United States is:

1. A robot arm comprising:
   a first holder having a first distal end and a first base end to be connected to a robot body and opposite to the first distal end in a first longitudinal direction of the first holder and comprising:
      a first base portion having the first base end and a first base thickness in a first axis direction along a first axis substantially perpendicular to the first longitudinal direction; and
      a first distal portion having the first distal end and connected to the first base portion, the first distal portion having a first distal thickness smaller than the first base thickness in the first axis direction;

a second holder having a second distal end and a second base end to be connected to the robot body and opposite to the second distal end in a second longitudinal direction substantially parallel to the first longitudinal direction and comprising:
  a second base portion having the second base end and a second base thickness in the first axis direction; and
  a second distal portion having the second distal end and connected to the second base portion, the second distal portion having a second distal thickness smaller than the second base thickness in the first axis direction;
a first rotator supported by and between the first distal portion and the second distal portion to be rotatable around the first axis;
a second rotator supported by the first rotator to be rotatable around a second axis substantially perpendicular to the first axis;
at least one motor;
a first bevel gear provided in the first distal portion to be driven by the at least one motor to rotate the first rotator around the first axis;
an another first bevel gear provided in the second distal portion to be driven by the at least one motor to rotate the second rotator around the second axis;
a second bevel gear engaging with the first bevel gear and the another first bevel gear to rotate the second rotator around the second axis;
a hypoid pinion disposed in the first base portion to be turnable about a second turning axis extending in the first longitudinal direction;
a hypoid gear provided to engage with the hypoid pinion to be turnable about a first turning axis substantially parallel to the first axis; and
spur gears provided in the first distal portion between the hypoid gear and the first bevel gear to transfer motive power force from the hypoid gear to the first bevel gear, each of the spur gears being turnable about each of axes substantially parallel to the first axis.

2. The robot arm according to claim 1, wherein a first region of the first holder and second holder in which the first distal portion and the second distal portion are disposed corresponds to a movable range of the first rotator.

3. The robot arm according to claim 1, wherein the first rotator and the second rotator each comprise a hollow structure.

4. The robot arm according to claim 1, wherein an arm frame comprises:
the first holder;
the second holder; and
a motor container in which the at least one motor is contained, the motor container being disposed at a position in the arm frame opposite to the first rotator in an elongated portion direction in which the arm frame extends.

5. The robot arm according to claim 1, further comprising:
a motive power transferer comprising:
  gears to transfer motive power of the at least one motor to at least one of the first rotator and the second rotator.

6. The robot arm according to claim 5,
wherein the motive power transferer comprises bearings supporting the hypoid pinion, and
wherein a bearing among the bearings is disposed in the first distal portion and the second distal portion.

7. The robot arm according to claim 1, further comprising:
a motive power transferer comprising:

first gears to transfer motive power of the at least one motor to the second rotator; and
second gears engaged with each other, each of the second gears being turnable about a turning axis extending along the first axis, and
wherein a gear among the second gears is disposed in the second distal portion.

8. The robot arm according to claim 1, further comprising:
a frame retainer supported by the first distal portion and the second distal portion and turnable about the first axis, the frame retainer comprising one end connected to the first rotator and an another end pressing an outer surface of the first distal portion and the second distal portion.

9. A robot system comprising:
a robot arm comprising:
  a first holder having a first distal end and a first base end to be connected to a robot body and opposite to the first distal end in a first longitudinal direction of the first holder and comprising:
    a first base portion having the first base end and a first base thickness in a first axis direction along a first axis substantially perpendicular to first longitudinal direction; and
    a first distal portion having the first distal end and connected to the first base portion, the first distal portion having a first distal thickness smaller than the first base thickness in the first axis direction;
  a second holder having a second distal end and a second base end to be connected to the robot body and opposite to the second distal end in a second longitudinal direction substantially parallel to the first longitudinal direction and comprising:
    a second base portion having the second base end and a second base thickness in the first axis direction; and
    a second distal portion having the second distal end and connected to the second base portion, the second distal portion having a second distal thickness smaller than the second base thickness in the first axis direction;
  a first rotator supported by and between the first distal portion and the second distal portion to be rotatable around the first axis;
  a second rotator supported by the first rotator to be rotatable around the second axis;
  at least one motor;
  a first bevel gear provided in the first distal portion to be driven by the at least one motor to rotate the first rotator around the first axis;
  an another first bevel gear provided in the second distal portion to be driven by the at least one motor to rotate the second rotator around the second axis;
  a second bevel gear engaging with the first bevel gear and the another first bevel gear to rotate the second rotator around the second axis;
  a hypoid pinion disposed in the first base portion to be turnable about a second turning axis extending in the first longitudinal direction;
  a hypoid gear provided to engage with the hypoid pinion to be turnable about a first turning axis substantially parallel to the first axis;
  spur gears provided in the first distal portion between the hypoid gear and the first bevel gear to transfer motive power force of the hypoid gear to the first bevel gear, each of the spur gears being turnable about each of axes substantially parallel to the first axis; and
a controller configured to control the robot arm.

10. The robot arm according to claim 2, wherein the first rotator and the second rotator each comprise a hollow structure.

11. The robot arm according to claim 2, wherein an arm frame comprises:
the first holder;
the second holder; and
a motor container in which the at least one motor is contained, the motor container being disposed at a position in the arm frame opposite to the first rotator in an elongated portion direction in which the arm frame extends.

12. The robot arm according to claim 3, wherein an arm frame comprises:
the first holder;
the second holder; and
a motor container in which the at least one motor is contained, the motor container being disposed at a position in the arm frame opposite to the first rotator in an elongated portion direction in which the arm frame extends.

13. The robot arm according to claim 10, wherein an arm frame comprises:
the first holder;
the second holder; and
a motor container in which the at least one motor is contained, the motor container being disposed at a position in the arm frame opposite to the first rotator in an elongated portion direction in which the arm frame extends.

14. The robot arm according to claim 2, further comprising:
a motive power transferer comprising:
gears to transfer motive power of the at least one motor to at least one of the first rotator and the second rotator.

15. The robot arm according to claim 3, further comprising:
a motive power transferer comprising:
gears to transfer motive power of the at least one motor to at least one of the first rotator and the second rotator.

16. The robot arm according to claim 4, further comprising:
a motive power transferer comprising:
gears to transfer motive power of the at least one motor to at least one of the first rotator and the second rotator.

17. The robot arm according to claim 10, further comprising:
a motive power transferer comprising:
gears to transfer motive power of the at least one motor to at least one of the first rotator and the second rotator.

18. The robot arm according to claim 11, further comprising:
a motive power transferer comprising:
gears to transfer motive power of the at least one motor to at least one of the first rotator and the second rotator.

19. The robot arm according to claim 12, further comprising:
a motive power transferer comprising:
gears to transfer motive power of the at least one motor to at least one of the first rotator and the second rotator.

20. The robot arm according to claim 13, further comprising:
a motive power transferer comprising:
gears to transfer motive power of the at least one motor to at least one of the first rotator and the second rotator.

21. The robot arm according to claim 1,
wherein the first holder further comprises a first tapering portion connecting the first base portion and the first distal portion such that a thickness of a part of the first distal portion in the first axis direction decreases from the first base thickness to the first distal thickness as the part of the first tapering portion is closer to the first distal portion,
wherein the first base portion extends in the first longitudinal direction, and
wherein the first base thickness is uniform regardless of a position of the first base portion in the first longitudinal direction.

22. The robot system according to claim 9,
wherein the first holder further comprises a first tapering portion connecting the first base portion and the first distal portion such that a thickness of a part of the first distal portion in the first axis direction decreases from the first base thickness to the first distal thickness as the part of the first tapering portion is closer to the first distal portion,
wherein the first base portion extends in the first longitudinal direction, and
wherein the first base thickness is uniform regardless of a position of the first base portion in the first longitudinal direction.

23. A robot arm comprising:
a first holder having a first distal end and a first base end to be connected to a robot body and opposite to the first distal end in a first longitudinal direction of the first holder and comprising:
a first base portion having the first base end and a first base thickness in a first axis direction along a first axis substantially perpendicular to the first longitudinal direction; and
a first distal portion having the first distal end and connected to the first base portion, the first distal portion having a first distal thickness smaller than the first base thickness in the first axis direction;
a second holder having a second distal end and a second base end to be connected to the robot body and opposite to the second distal end in a second longitudinal direction substantially parallel to the first longitudinal direction and comprising:
a second base portion having the second base end and a second base thickness in the first axis direction; and
a second distal portion having the second distal end and connected to the second base portion, the second distal portion having a second distal thickness smaller than the second base thickness in the first axis direction;
a first rotator supported by and between the first distal portion and the second distal portion to be rotatable around the first axis and having a first hollow structure having a first hollow structure thickness in the first axis direction, the first hollow structure thickness being substantially equal to a distance between the first base portion and the second base portion in the first axis direction;

a second rotator supported by the first rotator to be rotatable around a second axis substantially perpendicular to the first axis, the second rotator having a second hollow structure having a second hollow structure thickness in the first axis direction, the second hollow structure being substantially equal to the distance between the first base portion and the second base portion in the first axis direction;

at least one motor;

a first bevel gear provided in the first distal portion to be driven by the at least one motor to rotate the first rotator around the first axis;

an another first bevel gear provided in the second distal portion to be driven by the at least one motor to rotate the second rotator around the second axis; and a second bevel gear engaging with the first bevel gear and the another first bevel gear to rotate the second rotator around the second axis, wherein a structure of the first holder and a structure of the second holder are symmetric with respect to a plane on which the second axis extends.

24. The robot arm according to claim 23, wherein the first rotator comprises:

a first portion supported by the first distal portion to be rotatable around the first axis; and a second portion supported by the second distal portion to be rotatable around the first axis, the second portion being separated from the first portion via a gap as the first hollow structure in the first axis direction such that a thickness of the gap in the first axis direction is substantially equal to the first hollow structure thickness, and wherein the second rotator has a hole through which the second axis passes, the hole being the second hollow structure, a diameter of the hole in the first axis direction being equal to the second hollow structure thickness.

* * * * *